(12) United States Patent
Brauer

(10) Patent No.: US 10,891,504 B2
(45) Date of Patent: *Jan. 12, 2021

(54) PASSENGER REST COMPARTMENTS FOR REMOTE AIRCRAFT SPACES

(71) Applicant: Rockwell Collins, Inc., Cedar Rapids, IA (US)

(72) Inventor: R. Klaus Brauer, Seattle, WA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/126,952

(22) Filed: Sep. 10, 2018

(65) Prior Publication Data

US 2020/0184239 A1   Jun. 11, 2020

Related U.S. Application Data

(63) Continuation-in-part of application No. 15/993,310, filed on May 30, 2018, now Pat. No. 10,452,934, (Continued)

(51) Int. Cl.
*B64D 11/00* (2006.01)
*G06K 9/00* (2006.01)
(Continued)

(52) U.S. Cl.
CPC ...... *G06K 9/00845* (2013.01); *B64D 11/0015* (2013.01); *G02B 1/11* (2013.01);
(Continued)

(58) Field of Classification Search
CPC ............. B64D 11/00; B64D 11/003; B64D 2011/0076; B64D 2011/0046; B64D 2011/0069; B64D 2011/0084
See application file for complete search history.

(56) References Cited

U.S. PATENT DOCUMENTS 5,651,733 A    7/1997  Schumacher
5,784,836 A *  7/1998  Ehrick .................. B64D 11/00
                                                    52/79.8
(Continued)

FOREIGN PATENT DOCUMENTS

WO    2019207211 A1   10/2019

OTHER PUBLICATIONS

Ong, Thuy, "Emirates' new first class suites feature virtual windows and a 'zero-gravity' seat", The Verge, Dec. 1, 2017, 3 pages, https://www.theverge.com/2017/12/1/16723152/emirates-first-class-suites-virtual-windows-zero-gravity-seat.
(Continued)

*Primary Examiner* — Richard G Davis
(74) *Attorney, Agent, or Firm* — Suiter Swantz pc llo

(57) ABSTRACT

A system may include a vestibule disposed in a passenger cabin of an aircraft, the vestibule including a staircase for accessing a passenger rest cabin, the passenger rest cabin implemented above or below the passenger cabin of the aircraft. The system may also include a plurality of passenger rest compartments implemented in the passenger rest cabin, each of the plurality of the passenger rest compartments including a bed and a passenger service unit (PSU).

17 Claims, 14 Drawing Sheets

Related U.S. Application Data which is a continuation of application No. 15/382,633, filed on Dec. 17, 2016, now Pat. No. 10,089,544, which is a continuation-in-part of application No. 14/645,526, filed on Mar. 12, 2015, now Pat. No. 9,996,754, and a continuation-in-part of application No. 14/645,526, filed on Mar. 12, 2015, now Pat. No. 9,996,745.

(60) Provisional application No. 62/729,237, filed on Sep. 10, 2018, provisional application No. 62/201,886, filed on Jun. 13, 2014.

(51) Int. Cl.

| | |
|---|---|
| *H04N 7/18* | (2006.01) |
| *G02B 1/11* | (2015.01) |
| *G06F 3/00* | (2006.01) |
| *G06F 3/01* | (2006.01) |
| *H04N 5/232* | (2006.01) |
| *G06F 3/14* | (2006.01) |
| *H04N 5/225* | (2006.01) |
| *G02B 27/00* | (2006.01) |

(52) U.S. Cl.
CPC .............. *G06F 3/005* (2013.01); *G06F 3/013* (2013.01); *G06F 3/1446* (2013.01); *G06K 9/00604* (2013.01); *G06K 9/00791* (2013.01); *H04N 5/2253* (2013.01); *H04N 5/23219* (2013.01); *H04N 5/23293* (2013.01); *H04N 5/23296* (2013.01); *H04N 7/181* (2013.01); *B64D 2011/0061* (2013.01); *G02B 27/0006* (2013.01)

(56) References Cited

U.S. PATENT DOCUMENTS

| | | | | |
|---|---|---|---|---|
| 6,073,883 | A * | 6/2000 | Ohlmann | B64D 11/00 105/316 |
| 6,152,400 | A * | 11/2000 | Sankrithi | B64D 11/00 105/315 |
| 6,182,926 | B1 * | 2/2001 | Moore | B64D 11/00 244/118.5 |
| 6,393,343 | B1 | 5/2002 | Frey et al. | |
| 7,088,310 | B2 | 8/2006 | Sanford | |
| 7,290,735 | B2 * | 11/2007 | Saint-Jalmes | B64D 11/0601 244/118.6 |
| 7,823,831 | B2 * | 11/2010 | Guering | B64D 11/0601 105/316 |
| 8,152,102 | B2 * | 4/2012 | Warner | B64D 11/00 244/118.2 |
| 8,844,865 | B2 | 9/2014 | Gehm et al. | |
| 9,456,184 | B2 | 9/2016 | Barrou et al. | |
| 9,706,242 | B2 | 7/2017 | Dame et al. | |
| 2007/0125909 | A1 * | 6/2007 | Seiersen | B64D 11/00 244/118.5 |
| 2017/0057637 | A1 * | 3/2017 | Cole | B64D 11/00 |
| 2017/0094166 | A1 | 3/2017 | Riedel | |
| 2017/0094167 | A1 | 3/2017 | Riedel | |
| 2017/0137109 | A1 * | 5/2017 | Sieben | B64C 1/18 |
| 2017/0233058 | A1 | 8/2017 | Brunaux et al. | |

OTHER PUBLICATIONS

International Search Report and Written Opinion dated Mar. 24, 2020 for PCT/US2019/050343.

* cited by examiner

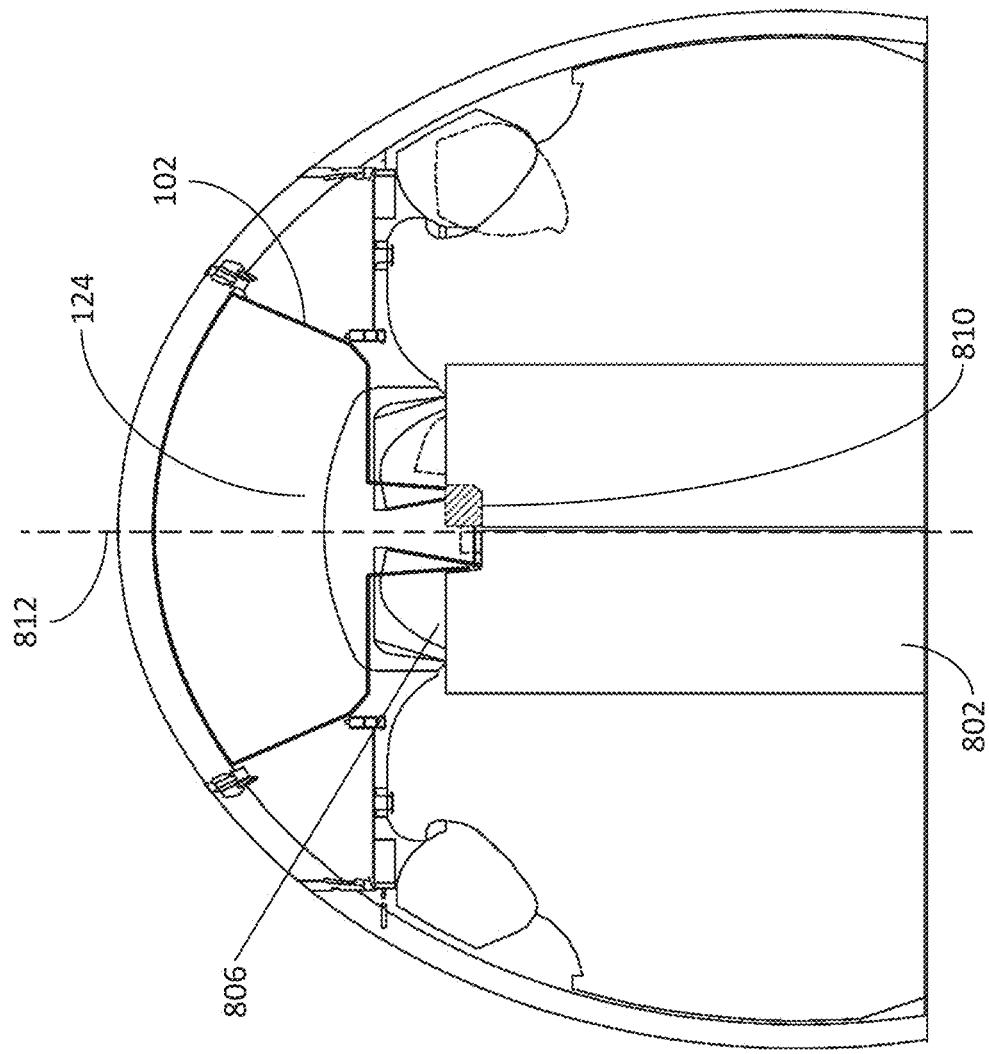

PASSENGER REST COMPARTMENTS FOR REMOTE AIRCRAFT SPACES

CROSS-REFERENCE TO RELATED APPLICATIONS

This application claims the benefit under 35 U.S.C. §§ 119 and/or 120 of:
(1) U.S. Provisional Application Ser. No. 62/729,237, filed Sep. 10, 2018; and
(2) U.S. patent application Ser. No. 15/993,310, filed May 30, 2018, which claims the benefit of:
  a. U.S. application Ser. No. 15/382,633 entitled "Apparatus and Method for Providing Attitude Reference for Vehicle Passengers" and filed Dec. 17, 2016, which claims priority to U.S. application Ser. No. 14/645,526 issued as U.S. Pat. No. 9,996,754 entitled "Apparatus and Method for Providing Attitude Reference for Vehicle Passengers" and filed Mar. 12, 2015, which claims priority to U.S. Provisional Application No. 62/011,886 filed on Jun. 13, 2014; and
  b. U.S. application Ser. No. 14/645,526 issued as U.S. Pat. No. 9,996,754 entitled "Apparatus and Method for Providing Attitude Reference for Vehicle Passengers" and filed Mar. 12, 2015, which claims priority to U.S. Provisional Application No. 62/011,886 filed on Jun. 13, 2014;
the contents of each of which are herein incorporated by reference in their entirety. This application is related to:
(1) U.S. patent application Ser. No. 16/127,035, filed Sep. 10, 2018;
(2) U.S. patent application Ser. No. 16/127,074, filed Sep. 10, 2018;
(3) U.S. patent application Ser. No. 16/126,981, filed Sep. 10, 2018;
(4) U.S. patent application Ser. No. 16/127,088, filed Sep. 10, 2018;
(5) U.S. patent application Ser. No. 16/126,910, filed Sep. 10, 2018;
(6) U.S. patent application Ser. No. 16/127,119, filed Sep. 10, 2018; and
(7) U.S. patent application Ser. No. 16/127,109, filed Sep. 10, 2018.

BACKGROUND

Passenger aircraft have incorporated onboard crew rest compartments (CRC) for the short-term use of their pilots or crew. CRCs may include lounge chairs or, more commonly, bunks allowing cabin crew to rest in a lie-flat position when not on duty (e.g., on transoceanic or other long-haul flights requiring multiple shifts). However, CRCs are low-capacity, generally providing no more than six to eight bunks at most. Further, CRCs are generally inaccessible to passengers for security reasons, and may be directly accessible from the cockpit only.

Airlines may wish to provide their economy-class passengers, e.g., those passengers occupying seats in the main cabin as opposed to premium lie-flat convertible seats or enclosed compartments such as partitioned seats or suites, with access to bunk facilities comparable to those provided by a CRC for use on similar long-haul flights. Clearly such compartments must meet regulatory requirements for passenger use (e.g., similarly to CRCs, passenger rest compartments may not be used during taxi, takeoff and landing (TTL) flight segments). As an additional challenge, however, airlines must make passenger rest facilities easily accessible to participating passengers from the main cabin (e.g., when the aircraft has reached a safe cruising altitude and passengers are permitted to enter the rest compartments) while minimizing added weight as well as minimizing disruption to the interior space and passenger seating within the main cabin displaced by said means of access.

The incorporation of rest cabins for pilots and crew of an aircraft, and occasionally for passengers as well, includes a variety of approaches. For example, U.S. Pat. No. 5,784,836 discloses a removable sleeping compartment assembly that may nest together several different modules incorporating sleeping berths, restroom facilities, and other convenience features. The modules may have an exterior configuration or form factor similar to that of a cargo container. Entry to the sleeping compartments may be achieved by a pivotable staircase or lift system from the main deck. Additionally, U.S. Pat. Nos. 6,182,926; 6,305,645; and 6,520,451 disclose a variety of configurations for a crew rest station contoured to occupy the overhead space between the curved top hull of the aircraft and the lowered ceiling and providing bunk portions, lavatory facilities, and storage space. The crew rest station may be located in the approximate midsection of the aircraft and accessible via an entry ladder, with forward, aft, or side bunk facilities arranged around a central deck. Further, U.S. Pat. No. 8,991,756 discloses a crew rest station including an overhead crew rest portion with forward and aft bunk portions arranged around a central deck portion. The central deck portion includes an emergency escape hatch, a fold-down jump seat, and a fold-down entry door capable of covering a stairway of a central entry vestibule, via which the overhead crew rest portion may be accessed from the passenger seating area.

Such compartments may be required to meet regulatory requirements for crew rest compartments in aircraft as set forth by the Federal Aviation Administration (FAA) of the United States Government. In addition, the passenger rest facilities should easily accessible to participating passengers occupying the premium areas while minimizing added weight and minimizing disruption to the interior space and passenger seating within the premium areas.

SUMMARY

In one aspect, embodiments of the inventive concepts disclosed herein are directed to a system. The system may include a vestibule disposed in a passenger cabin of an aircraft, the vestibule including at least one staircase for accessing at least one passenger rest cabin, each of the at least one passenger rest cabin implemented above or below the passenger cabin of the aircraft. The system may also include a plurality of passenger rest compartments implemented in the at least one passenger rest cabin, each of the plurality of the passenger rest compartments including a bed and a passenger service unit (PSU).

In a further aspect, embodiments of the inventive concepts disclosed herein are directed to a system. The system may include a vestibule disposed in a passenger cabin of an aircraft, the vestibule including a first staircase and a second staircase, the first staircase for accessing a first passenger rest cabin, the second staircase for accessing a second passenger rest cabin, the first passenger rest cabin implemented above the passenger cabin of the aircraft, the second passenger rest cabin implemented below the passenger cabin of the aircraft. The system may further include a plurality of passenger rest compartments implemented in the first passenger rest cabin and the second passenger rest cabin, each of the plurality of the passenger rest compartments including a bed and a passenger service unit (PSU).

In a further aspect, embodiments of the inventive concepts disclosed herein are directed to an aircraft system. The aircraft system may include a vestibule disposed in a passenger cabin of an aircraft, the vestibule including a staircase for accessing a passenger rest cabin implemented above the passenger cabin of the aircraft. The aircraft system may further include a plurality of passenger rest compartments implemented in the passenger rest cabin, each of the plurality of the passenger rest compartments including a bed, a display, and a passenger service unit (PSU). The passenger rest cabin may include a central corridor and graspable handles spaced along the central corridor, wherein some of the plurality of passenger rest compartments are implemented on a first side of the central corridor and other of the plurality of passenger rest compartments are implemented on a second side of the central corridor.

BRIEF DESCRIPTION OF THE DRAWINGS

Implementations of the inventive concepts disclosed herein may be better understood when consideration is given to the following detailed description thereof. Such description makes reference to the included drawings, which are not necessarily to scale, and in which some features may be exaggerated and some features may be omitted or may be represented schematically in the interest of clarity. Like reference numerals in the drawings may represent and refer to the same or similar element, feature, or function. In the drawings:

FIGS. 8A and 8B are respectively forward cross-section and forward isometric views of the aircraft of FIG. 1.

DETAILED DESCRIPTION

Figure 1:
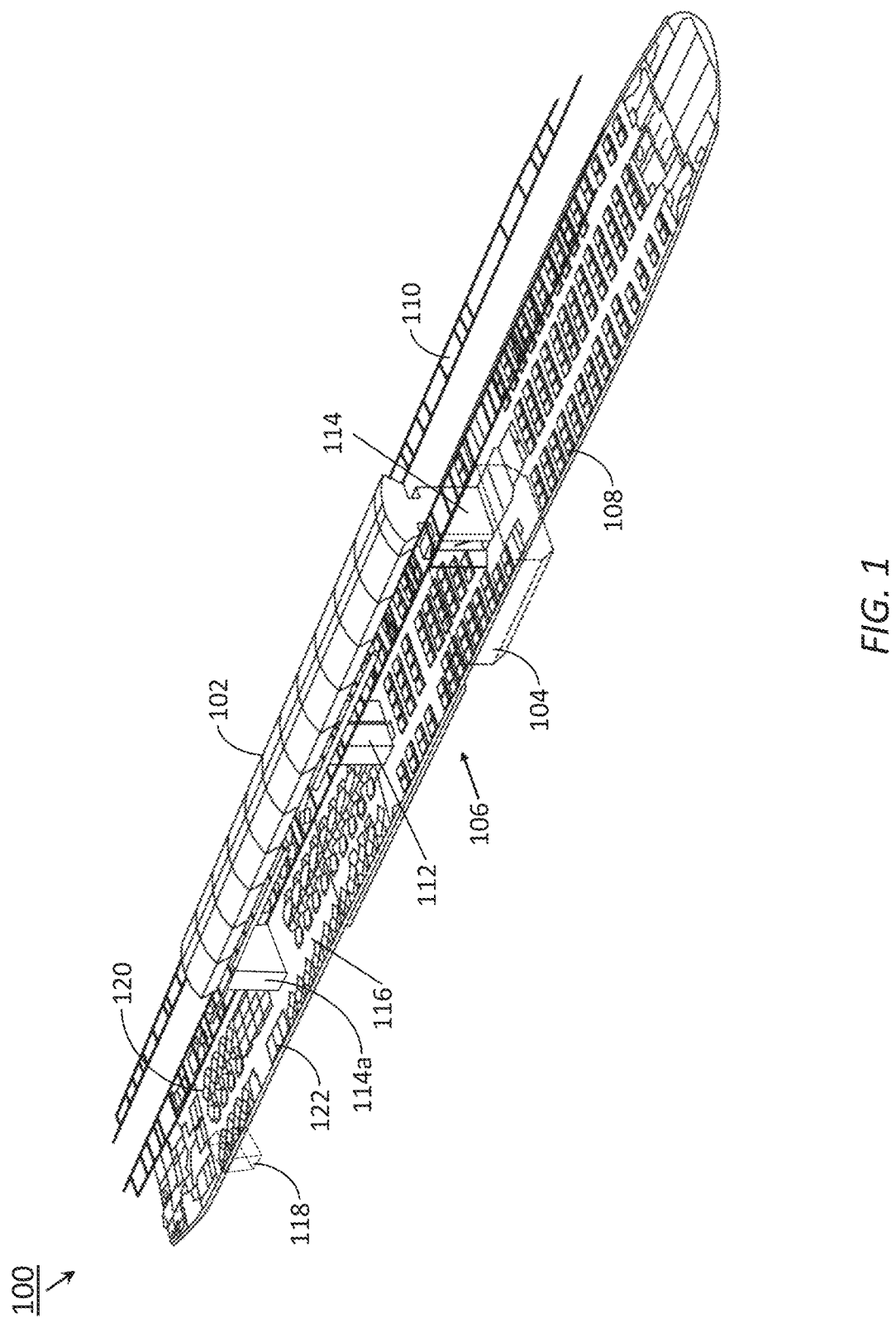
FIG. 1 illustrates an exemplary embodiment of an aircraft according to the inventive concepts disclosed herein.

Before explaining at least one embodiment of the inventive concepts disclosed herein in detail, it is to be understood that the inventive concepts are not limited in their application to the details of construction and the arrangement of the components or steps or methodologies set forth in the following description or illustrated in the drawings. In the following detailed description of embodiments of the instant inventive concepts, numerous specific details are set forth in order to provide a more thorough understanding of the inventive concepts. However, it will be apparent to one of ordinary skill in the art having the benefit of the instant disclosure that the inventive concepts disclosed herein may be practiced without these specific details. In other instances, well-known features may not be described in detail to avoid unnecessarily complicating the instant disclosure. The inventive concepts disclosed herein are capable of other embodiments or of being practiced or carried out in various ways. Also, it is to be understood that the phraseology and terminology employed herein is for the purpose of description and should not be regarded as limiting.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only, and should not be construed to limit the inventive concepts disclosed herein in any way unless expressly stated to the contrary.

Further, unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of the "a" or "an" are employed to describe elements and components of embodiments of the instant inventive concepts. This is done merely for convenience and to give a general sense of the inventive concepts, and "a" and "an" are intended to include one or at least one and the singular also includes the plural unless it is obvious that it is meant otherwise.

Finally, as used herein any reference to "one embodiment," or "some embodiments" means that a particular element, feature, structure, or characteristic described in connection with the embodiment is included in at least one embodiment of the inventive concepts disclosed herein. The appearances of the phrase "in some embodiments" in various places in the specification are not necessarily all referring to the same embodiment, and embodiments of the inventive concepts disclosed may include one or more of the features expressly described or inherently present herein, or any combination of sub-combination of two or more such features, along with any other features which may not necessarily be expressly described or inherently present in the instant disclosure.

Broadly, embodiments of the inventive concepts disclosed herein are directed to a passenger aircraft capable of providing rest compartments for passengers within remote areas of the aircraft. "Remote areas" refers to portions of the aircraft outside the main passenger cabin potentially occupyable by passengers. For example, passenger rest compartments (e.g., berths, bunks) may be incorporated into the overhead crown area of the fuselage, directly above the main passenger cabin. Additionally or alternatively, rest compartments may be incorporated into a lower lobe area under the main passenger cabin, such as a cargo deck. In either case, passenger rest compartments may be incorporated into a larger cabin structure above or below the main passenger cabin and accessible therefrom by passengers, e.g., when the aircraft reaches a safe cruising altitude. Unlike rest cabins dedicated to use by aircraft pilots and cabin crew, the passenger rest cabins may be accessible from the main passenger cabin rather than isolated therefrom. Similarly, the passenger rest cabins and their individual rest compartments may incorporate additional safety features and amenities developed with passenger use in mind.

It is noted herein that an aircraft including an aircraft suite with an overhead passenger rest cabin and a lower lobe passenger rest cabin may be configured to meet or exceed regulatory requirements for crew rest compartments in aircraft as set forth by the Federal Aviation Administration (FAA) of the United States Government. The regulatory requirements may be codified (e.g., including, but not limited to, regulations codified in 14 C.F.R. 25: Airworthiness Standards: Transport Category Airplanes and 14 C.F.R. 117: Flight and Duty Limitations and Rest Requirements: Flightcrew Members). In addition, the regulatory requirement may include special condition regulations set forth for specific aircraft (e.g., including, but not limited to, regulations such as those found in 68 FR 18843: Special Conditions: Boeing Model 777 Series Airplanes; Overhead Crew Rest Compartments, and 79 FR 2359: Special Condition: Airbus Model A350-900 Series Airplane Crew Rest Compartments). Further, the regulatory requirements may be provided in advisory circulars (e.g., including, but not limited to, Advisory Circular AC117-1).

It is contemplated that passenger rest compartments will not be occupied by passengers during taxi, takeoff and landing (TTL) flight segments. Rather, passengers will occupy their assigned seats in the main passenger cabin during said flight segments. When the aircraft reaches a safe cruising altitude (e.g., when passengers are generally permitted to leave their seats), those passengers having access to a rest compartment may be permitted to access their assigned rest compartment if they so choose. Passenger access to rest compartments may be via a dedicated vestibule adjacent to one or more central aisles (e.g., adjacent to, and accessible via, both aisles of a double-aisle aircraft). Access doors in the vestibule may lead to compact staircases or similar means of ascent or descent by which passengers may reach the overhead or lower-lobe rest cabins. Each remote area of the aircraft wherein rest cabins are incorporated (e.g., the overhead crown area or lower-lobe cargo deck) may have a dedicated ascent/descent device, such that the progress of passengers wishing to ascend into an overhead cabin is not obstructed by that of passengers wishing to descend into the lower lobe area. Rest cabins may incorporate a transitional space or landing between the ascent/descent staircase and the individual bunks, which space may include a station space where flight attendants and crew may access emergency equipment storage (e.g., first aid supplies, fire containment bags) and communications facilities. Alternatively, the transitional space may include temporary seating facilities for an on-site crewmember, proximate to storage and facilities. The transitional space may temporarily accommodate a passenger entering or leaving the rest cabin. It is contemplated that under normal conditions, one or more cabin crewmembers may be dedicated to monitoring the rest cabins inflight; however, said crewmembers may remotely monitor the rest cabin from the main deck (e.g., via the aforementioned sensor system), responding to the rest cabin if their attention is required as described below. A flight attendant/crew station as described above may be positioned at either vertical end of a bidirectional entry vestibule, e.g., at the respective entrances to the overhead passenger rest cabin (at its aft end) and the lower lobe rest cabin. Additional crew stations may be positioned, e.g., at the opposing forward end of the overhead passenger rest cabin and in the portion of the lower lobe rest cabin most distant from the entry station. For example, additional lower lobe rest stations may be positioned at the opposing end of a corridor passing through a single lower lobe rest cabin module, or at the point of transition between two adjacent lower lobe rest cabin modules. In some embodiments, a second entry vestibule may be positioned at the forward or terminal end of the overhead passenger rest cabin, via which passengers and crew may enter or exit the overhead passenger rest cabin.

Each rest cabin may include additional access hatches for the emergency use of passengers or crew. Should the aircraft encounter severe turbulence or other adverse conditions, passengers may be instructed to return to the main cabin and occupy their assigned seats. In some cases, cabin crew may advise those passengers occupying rest compartments to remain there, e.g., until it is determined that passengers may safely return to their seats. Each rest compartment may include a bunk occupyable by a passenger in a prone or reclined position, allowing the passenger to rest or sleep therein. Individual bunks may be arranged within a rest cabin so as to maximize the amount of standard bunks within a rest cabin of a given size (e.g., equivalent in volume to a standard cargo compartment) without truncating the size of any individual bunk. For example, two or more bunks may be stacked atop each other within a rest cabin. Individual bunks may be disposed at a fixed angle to others, e.g., substantially parallel or perpendicular to the longitudinal axis (roll axis) of the aircraft. Alternatively, individual bunks may be arranged longitudinally on either side of a central aisle, by which each bunk may be accessed.

It is contemplated that cabin crew may not be physically present to monitor rest cabins in person, although some rest cabins may be configured to include a seating element temporarily occupyable by a crewmember. The rest cabins may be monitored remotely by cabin crew on the main deck, who may be alerted if conditions therein merit a response. For example, "rough" or low-resolution infrared sensors may monitor the rest cabin and individual compartments without intruding upon the privacy of occupying passengers, while visual cameras may monitor common areas of the rest cabin. Sensors and/or cameras may monitor the presence or absence of passengers, movement, and heat signatures, alerting the cabin crew if conditions warrant. If, for example, conditions consistent with an unauthorized presence (e.g., a passenger is present within a rest cabin or rest compartment when s/he should not be), an altercation between passengers, adverse environmental conditions, a medical emergency (e.g., as determined by anomalous movement of a given passenger over time), or a potential fire (e.g., excessive heat persisting over time) are detected, the crew may be alerted or summoned to the rest cabin depending upon the severity of the scenario. Rest cabins may incorporate preventative safety measures in order to prevent or reduce the risk of such emergency scenarios. For example, as the charging of mobile devices (in particular, the rechargeable batteries of cellular phones or tablets) may contribute to the risk of onboard fire, charging devices (e.g., inductive wireless charging devices) may be provided for passengers occupying the rest cabin within a fireproof enclosure, such that a device may not be charged unless placed therein. Such fireproof charging facilities may be placed proximate to an infrared sensor for added safety. Similarly, portable fire containment bags (FCB) will be securely stored throughout the overhead and lower lobe rest cabins for the containment of any mobile devices or batteries thereof determined to be at risk of combustion. Infrared temperature sensors may further be positioned to cover the whole of the common area (e.g., shared spaces or common access corridors). The temperature sensors, in concert with onboard smoke detectors, may determine not only the presence of a fire, but its location, such that cabin crew may respond quickly and passengers evacuated to the main cabin by unobstructed routes.

Each bunk may incorporate a privacy partition and may be equipped with safety features comparable to a main-deck seat, such as a safety belt and deployable oxygen mask, as well as a passenger service unit (PSU) incorporating a positionable reading light, call button, panic button, and adjustable gasper outlet. Each rest compartment may further include a two-way audio connection so that the occupant may communicate with cabin crew. Rest compartments may incorporate work surfaces that fold out or down into the compartment from the wall or ceiling for the temporary use of occupants. As individual rest compartments may lack a physical window, the compartments may incorporate a "virtual window", whereby a display surface connected to exterior cameras or image sensors provides attitude cues to the occupant via externally captured images. The display surface may be embedded into the compartment wall or pivotably attached, such that a single display surface may serve as a virtual window while substantially flush with the wall but may be pivoted out or down for access to the inflight entertainment system.

A passenger rest cabin incorporated into the overhead crown area may be modular (e.g., comprising one or more connected or linked modules), such that the size of the rest cabin may be scaled up or down depending on the size of the embodying aircraft or the desired number of rest compartments. Similarly, one or more modular overhead rest compartments may be easily installed into the aircraft during an outfit or refit, with portions of the modular overhead passenger rest cabins dedicated to electrical, ventilation, or other service connections between modules. The overhead passenger rest cabin may be proportioned to maximize the available space for individual rest compartments and access corridors while minimally intruding upon the space of main cabin passengers. For example, in order to maximize the height of the overhead cabin access corridor, the main cabin ceiling may be lowered, e.g., over the centermost seats. Similarly, main cabin lavatories may be "notched", or partially reduced in height or truncated, to accommodate the overhead passenger rest cabin.

As noted above, it is contemplated that the overhead passenger rest cabin will not be occupied by passengers during any flight segment, or under any conditions, where immediate evacuation of the aircraft may be necessary (e.g., TTL phases or periods of excessive turbulence or other adverse environmental conditions). Accordingly, the overhead passenger rest cabin may be equipped with bi-directional hatches deployable into an aisle of the main cabin. For example, should conditions within the overhead cabin warrant the evacuation of passengers or the rapid intervention of cabin crew, the bi-directional hatches may include access ladders that deploy downward into the main cabin. Passengers may rapidly exit the overhead cabin, and cabin crew may likewise rapidly ascend into the overhead cabin, via the access ladders. Bi-directional hatches may be easily deployable by passengers; e.g., a single lever or button may release the access ladder from its restraints while activating any necessary emergency lights or warnings.

The overhead passenger rest cabins, as noted above, may incorporate individual rest compartments situated along either side of a central corridor and accessible therefrom. It is contemplated that due to the limited interior space available for incorporating the overhead passenger rest cabin into an aircraft interior while minimally intruding upon main cabin space, the central access corridor may be of limited height, such that passengers of average size may not be able to traverse the access corridor without crouching to some extent. Accordingly, the central access corridor may incorporate handholds at regular intervals therealong, sized and placed to reduce strain associated with remaining in a crouched position while traversing the corridor. Similarly, the access corridor may include shifts in lighting or ventilation along its length to prevent claustrophobia; transitional spaces may be positioned along the corridor to "break up" the space.

Similarly to the overhead crown rest cabin, the lower lobe rest cabins may be modular in nature. For example, the lower lobe rest cabins may be sized and shaped to match the proportions of a cargo container, such that one or more such rest cabins may be easily incorporated into the lower cargo deck. The modular rest cabins may likewise include dedicated entry and exit portals and electrical, airflow, and other service connections therebetween, such that the overall amount of available lower lobe bunk space may be scaled up or down as needed or desired. For example, passengers may descend into a first lower lobe rest cabin, which may include transitional space and/or temporary crew seating facilities, and pass therefrom into successive rest cabins through the entry and exit portals. Lower lobe rest cabins may include additional ceiling hatches deployable if rapid evacuation of the rest cabins upward into the main cabin is necessary. In some embodiments, lower lobe rest cabins may include modular pairs of interconnected rest cabins. For example, a first cabin and a second cabin may be interconnected such that a first space within the first cabin and a second adjoining space within the second cabin may be combined into a full size rest compartment or bunk shared between the two cabins, where neither the first space nor the second space would alone be large enough to accommodate a full rest compartment.

Additionally or alternatively, embodiments of the inventive concepts disclosed herein are directed to a passenger aircraft incorporating additional reserved spaces adjacent to, and accessible from, selected lay-flat or tracked aircraft seats. For example, first-class, business-class, or equivalent passengers may be assigned main-deck seats capable of tracking backward or forward, or of reconfiguration into a lay-flat state whereon the passenger may occupy the seat in a prone position. Such lay-flat seats or tracking mechanisms may conceal a hatch set into the main deck floor, whereby the occupying passenger may access a private or semi-private compartment, e.g., on the cargo deck immediately below the main deck. Said private or semi-private compartment (e.g., two adjacent seats may share a compartment) may provide an alternative seating area or bunk area for the passenger while preserving available space on the main deck for other seating facilities; compartments may be windowless but equipped with "virtual windows" as described above.

FIG. 1—Aircraft Layout, Generally

Referring to FIG. 1, an exemplary embodiment of a passenger aircraft 100 according to the inventive concepts disclosed herein may include overhead passenger rest cabins 102 and lower lobe passenger rest cabins 104. For example, the aircraft 100 may include only overhead passenger rest cabins 102, only lower lobe passenger rest cabins 104, or both. Overhead passenger rest cabins 102 may be incorporated into the overhead crown area of the aircraft 100, above the main passenger cabin 106 (e.g., main deck) and the passenger seats (108), overhead bins (110), and monuments (112) (e.g., storage monuments, galley monuments, audio-visual monuments housing an inflight entertainment system, lavatories). Lavatories, monuments 112, zone dividers, or other structures proximate to the longitudinal center of the main passenger cabin 106 may be notched or otherwise modified to accommodate the overhead passenger rest cabin 102. Similarly, lower lobe passenger rest cabins 104 may be incorporated on a cargo deck directly underneath the main passenger cabin 106. Passengers may access the overhead passenger rest cabins 102 or lower lobe passenger rest cabins 104 via an entry vestibule (114) located within the main passenger cabin 106.

The entry vestibule 114 may connect the overhead passenger rest cabins 102 and the lower lobe passenger rest cabins 104 (when both are incorporated within the aircraft 100) while providing a separate path for passengers to access each rest cabin from the main passenger cabin 106 (e.g., via ascending or descending staircases). It is contemplated that the entry vestibule 114 will be the primary means of passenger access to the overhead passenger rest cabins 102 and the lower lobe passenger rest cabins 104, and the sole means of access during non-emergency conditions. In some embodiments, the entry vestibule 114 may be located at the aft end of the overhead passenger rest cabin 102, and an auxiliary vestibule (114a) may provide a secondary entrance and exit to and from the main passenger cabin 106 and the overhead passenger rest cabin 102. The overhead passenger rest cabins 102 may include additional escape hatches (not shown) providing an emergency escape route (e.g., to main aisles (116) of the main passenger cabin 106) for passengers to rapidly exit the overhead passenger rest cabins. The lower lobe passenger rest cabins 104 may similarly include escape hatches for emergency return to the main passenger cabin 106. In some embodiments, the aircraft 100 may incorporate additional lower lobe rest compartments (118) situated on the lower cargo deck. For example, the additional lower lobe rest compartments may be located substantially underneath selected partitioned premium seats (120) or premium compartments (122) in premium seating sections of the aircraft 100 and accessible to the occupants of said premium seats or premium compartments (e.g., during safe cruising segments) via proximate hatches in the main deck floor.

Figure 2:
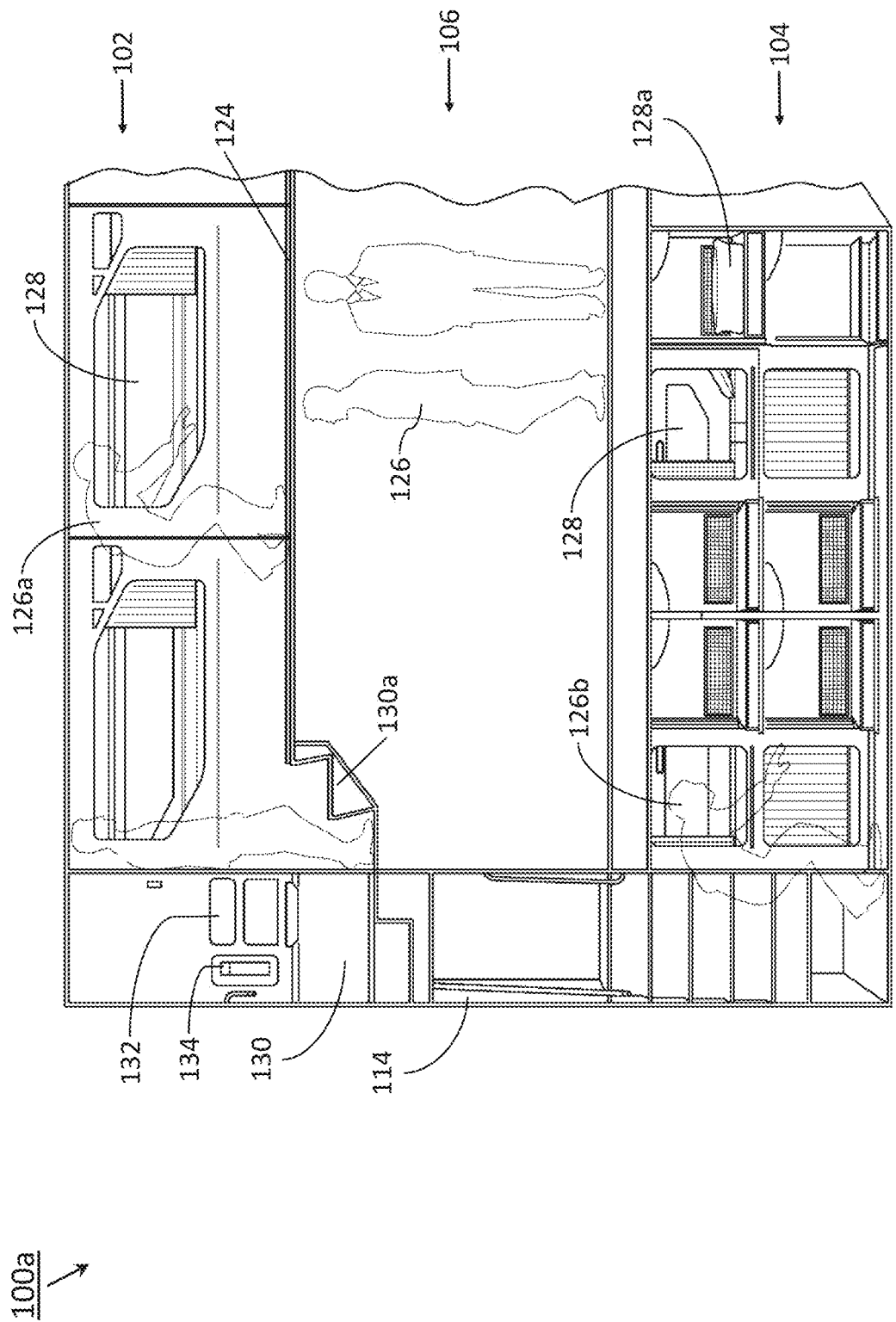
FIG. 2 is a partial cross-section view of the aircraft of FIG. 1.

FIG. 2—Relative Cabin Proportions

Referring to FIG. 2, the passenger aircraft 100a may be implemented and may function similarly to the aircraft 100 of FIG. 1, except that the aircraft 100a may include an overhead passenger rest cabin 102 and a lower lobe passenger rest cabin 104 connected by an entry vestibule 114 to the main passenger cabin 106. For example, the overhead passenger rest cabin 102 may be incorporated into remote space above the main passenger cabin 106 such that the floor of the central corridor (124) of the overhead passenger rest cabin corresponds substantially to the ceiling of the main passenger cabin 106 (e.g., over the centermost portion of the main cabin). The height of the overhead passenger rest cabin 102 that a passenger (126) of average height may remain comfortably standing, e.g., in a main aisle (118, FIG. 1) of the main passenger cabin. However, space limitations within the aircraft 100a may require passengers (126a-b) respectively traversing the overhead passenger rest cabin 102 and lower lobe passenger rest cabin 104 to do so in a partially crouched position. The overhead passenger rest cabin 102 may include individual passenger rest compartments (128) or bunks extending along either side of the central corridor 124, substantially parallel to the longitudinal or roll axis of the aircraft 100a. The overhead passenger rest cabin 102 may include a transitional space (130) between the entry vestibule 114 and the central corridor 122; the transitional space may include emergency equipment storage (132) and an emergency handset (134) for communicating with the cockpit or cabin crew, or additional steps (130a) linking the entry vestibule and the central corridor. Similarly, the lower lobe passenger rest cabin 104 may incorporate individual passenger rest compartments 128 aligned substantially parallel to the roll axis as well as passenger rest compartments (128a) aligned at an angle to the roll axis, e.g., perpendicular to the roll axis or substantially parallel to the pitch axis of the aircraft 100a.

FIG. 3A/B-INDIVIDUAL BUNKS

Figure 3A:
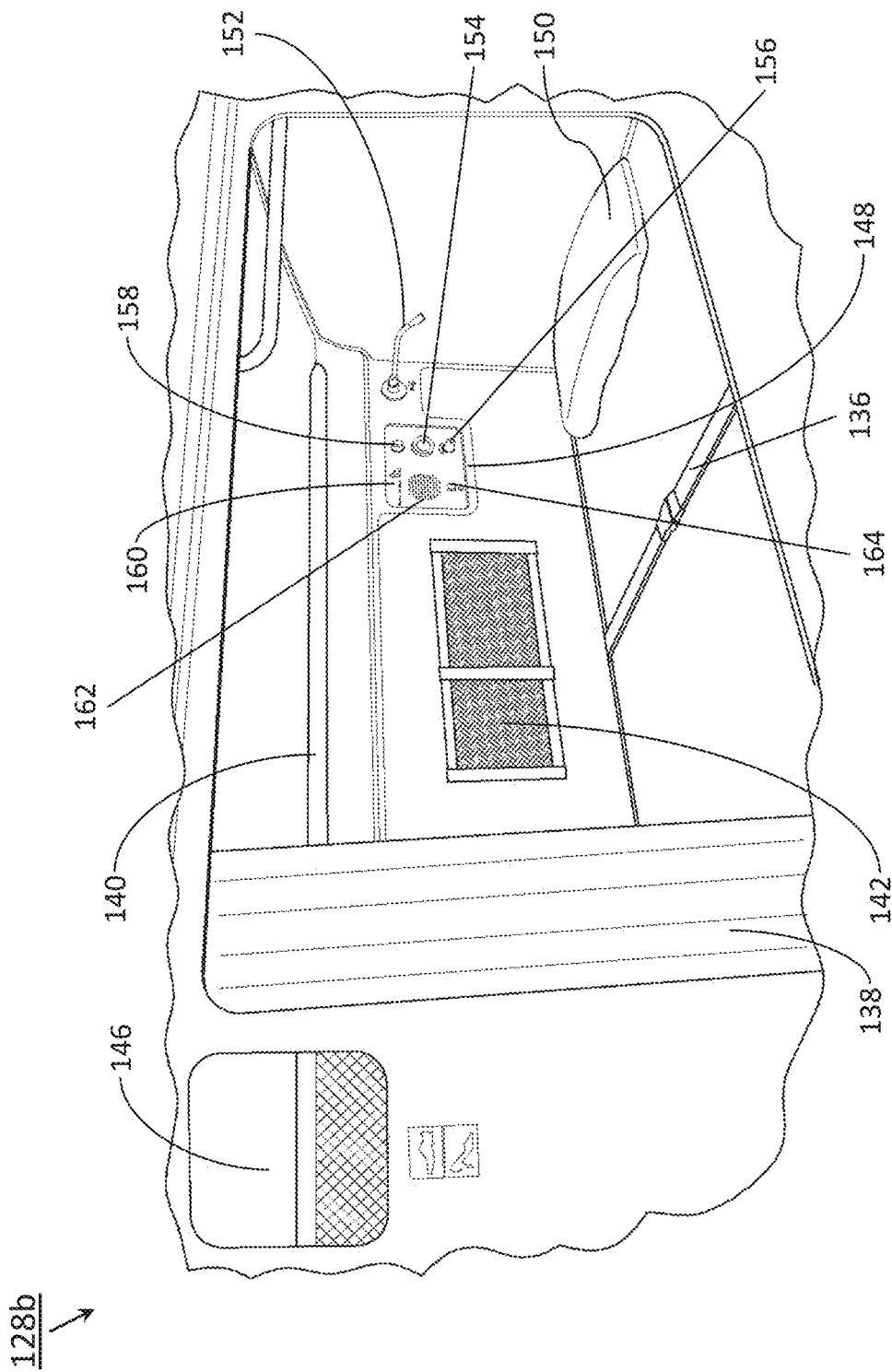
FIGS. 3A and 3B are respectively head-end and foot-end isometric views of a passenger rest compartment of the aircraft of FIG. 1.
Figure 3B:
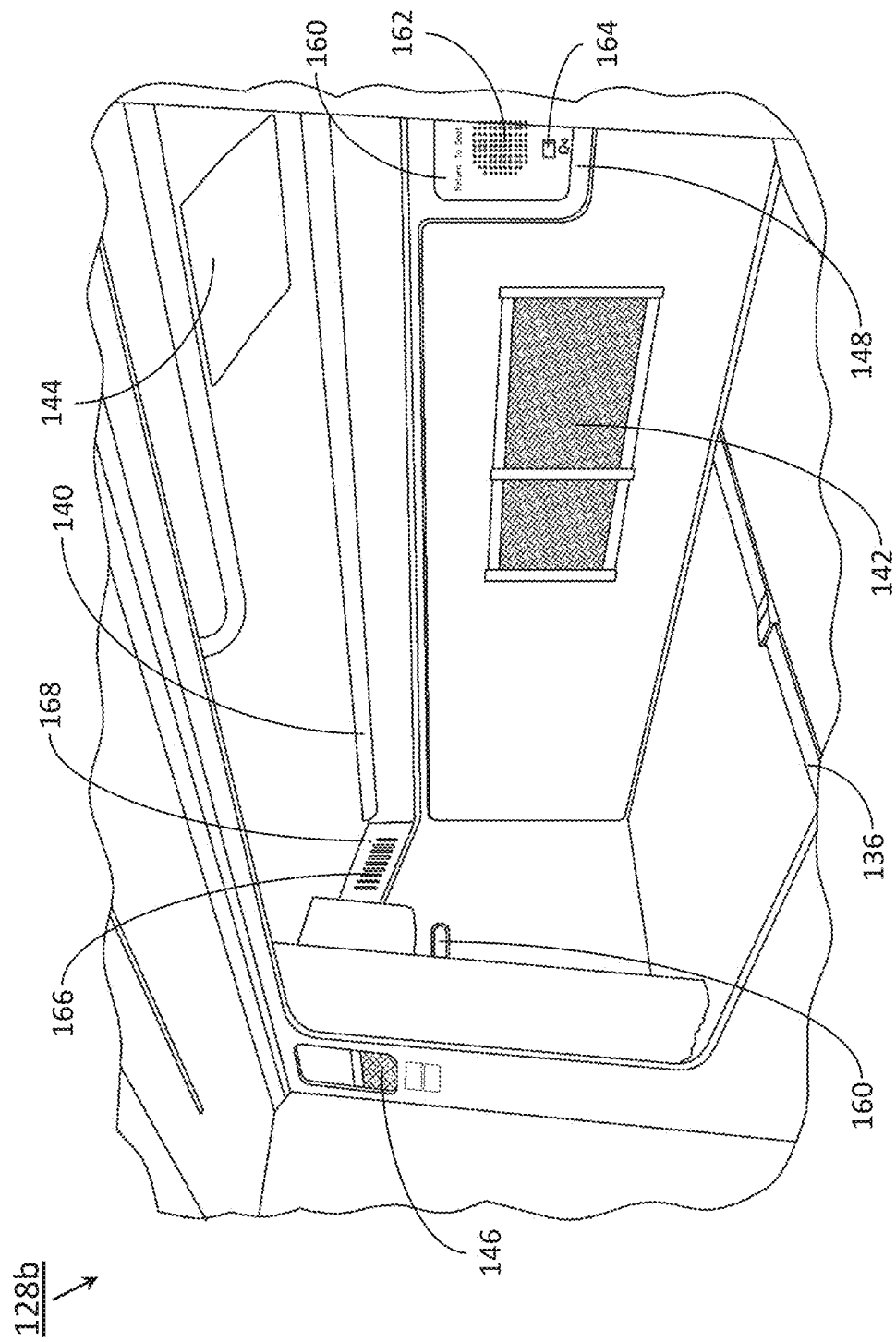

Referring to FIGS. 3A and 3B, the passenger rest compartment 128b (bunk) may be implemented and may function similarly to the passenger rest compartments 128, 128a of FIG. 2, except that the passenger rest compartment 128b may include a safety belt 136, a privacy partition 138 (e.g., privacy curtain), ambient lighting 140, interior stowage compartments 142, an emergency oxygen drop 144, ventilated shoe stowage compartments 146 (which may, for example, be situated or accessed immediately outside or adjacent to the rest compartment), and a passenger service unit 148 (PSU). For example, the PSU 148 may be positioned proximate to the head end of the rest compartment 128b (e.g., where a pillow 150 may be provided for the passenger's head). The PSU 148 may include a positionable reading light 152 and gasper outlet 154, temperature controls 156, a crew call button 158, lighted signage 160 (e.g., signaling the occupying passenger to return to his/her seat, fasten his/her safety belt 136, no smoking). The PSU may further include a speaker/microphone 162 and call button 164 allowing two-way audio communication between the occupying passenger and the cabin crew. Referring in particular to FIG. 3B, the foot end of the passenger rest compartment 128b may include an air return 166 and infrared sensors 168.

Figure 4:
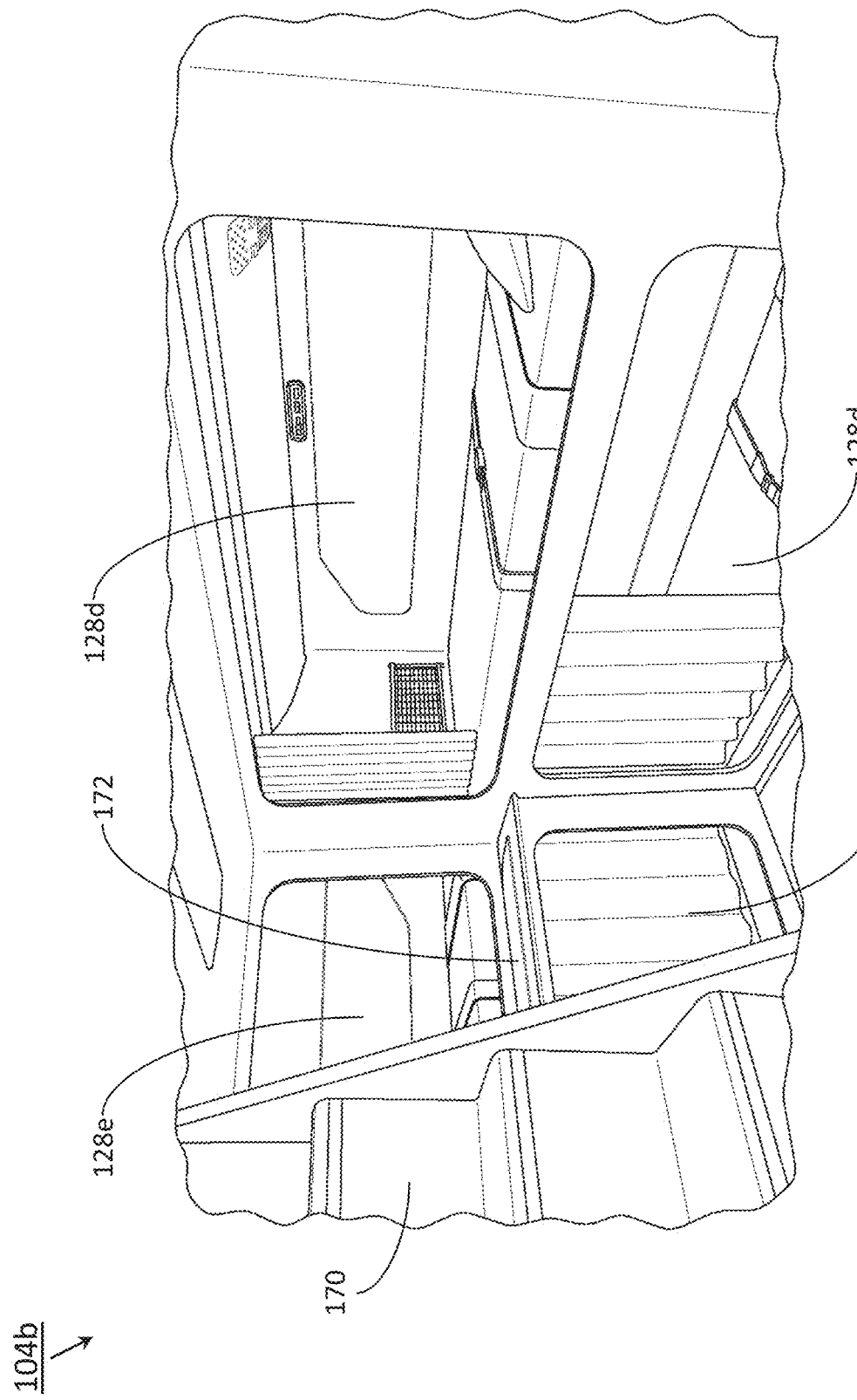
FIG. 4 is a partial isometric view of a lower lobe passenger rest cabin of the aircraft of FIG. 1.

FIG. 4—Lower Lobe Cabin Layout

Referring to FIG. 4, the lower lobe passenger rest cabin 104a may be implemented and may function similarly to the lower lobe passenger rest cabin 104 of FIG. 2, except that the lower lobe passenger rest cabin 104a may be accessed by a descending staircase (170) connecting the lower lobe passenger rest cabin to the entry vestibule (114, FIG. 2) and thereby to the main passenger cabin (106, FIG. 2). For example, the staircase 170 may descend into the center of the lower lobe passenger rest cabin 104a at a predetermined angle. The passenger rest compartments 128c-e may be implemented and may function similarly to the passenger rest compartments 128b of FIGS. 3A/B, except that the passenger rest compartments 128c, 128 e and the passenger rest compartment 128d may be respectively oriented substantially parallel or at an angle to (e.g., substantially perpendicular to) the longitudinal/roll axis of the aircraft (100, FIG. 1) and positioned around the perimeter of the lower lobe passenger rest cabin 104a. The passenger rest compartments 128d may be positioned in substantially vertical stacks of two or more bunks, depending on the height of the bunks relative to the height of the lower lobe passenger rest cabin 104a. The passenger rest compartment 128e, for example, may be stacked atop the passenger rest compartment 128c in a staggered fashion, set back from the passenger rest compartment 128 by a shelf (172). For example, the passenger rest compartment 128e may combine space from two adjacent modular lower lobe passenger rest cabins 104a, where neither rest cabin on its own may include sufficient space for a full passenger rest compartment. Lower lobe passenger rest cabins 104, 104a may be proportioned for a form factor compatible with standard cargo containers; individual lower lobe passenger rest cabins may be palletized or otherwise capable of addition to, or removal from, the aircraft 100 via the existing cargo loading/unloading system. Further, depending on size, configuration, and desired capacity, the aircraft 100 may incorporate lower lobe passenger rest cabins (104a) either forward or aft of the lower lobe passenger rest cabin 104 connected to the main passenger cabin 106 via the entry vestibule 114.

Figure 5:
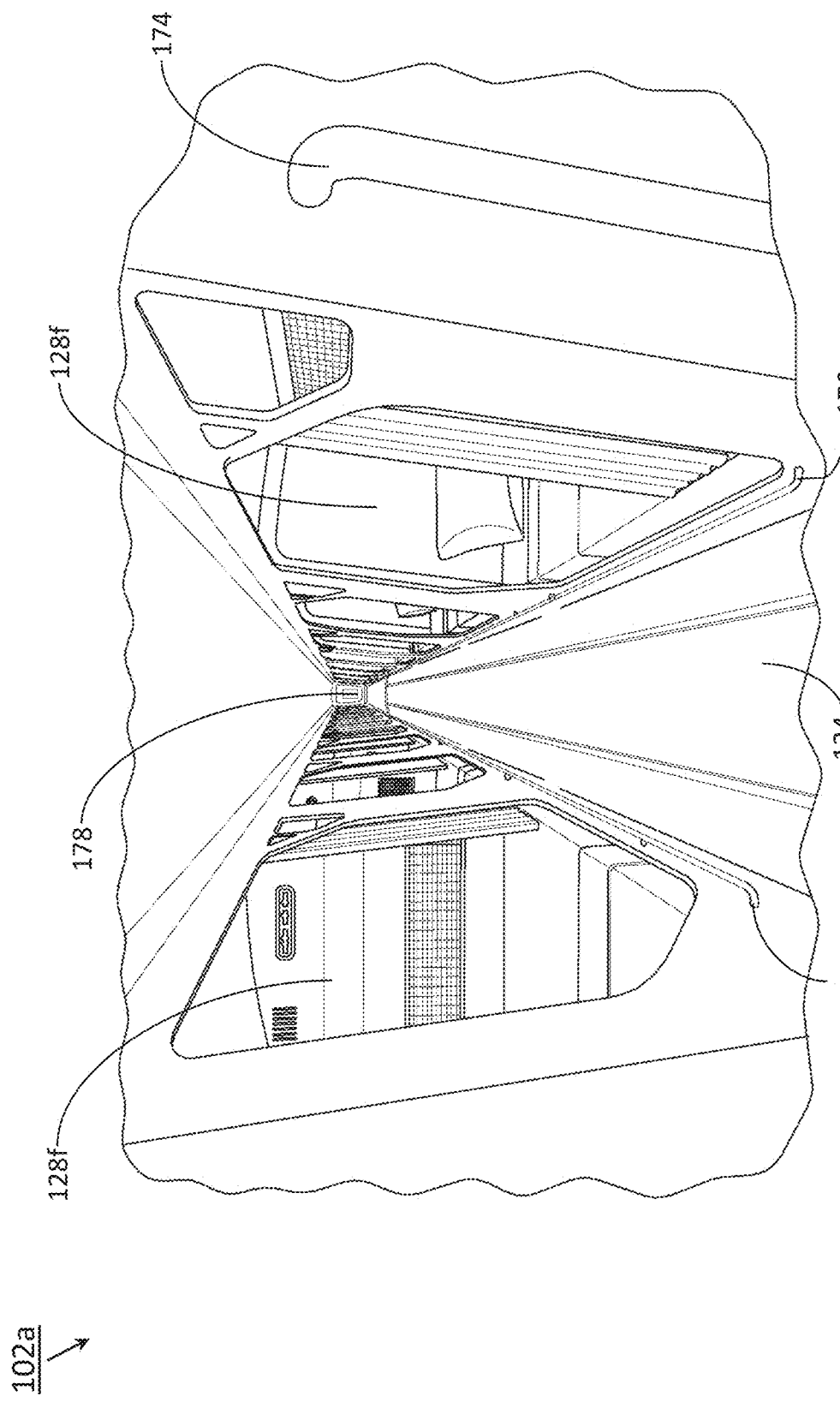
FIG. 5 is a partial longitudinal view of an overhead passenger rest cabin of the aircraft of FIG. 1.

FIG. 5—Overhead Cabin Layout

Referring to FIG. 5, the overhead passenger rest cabin 102a and individual rest compartments 128f may be implemented and may function similarly to the overhead passenger rest cabin 102 of FIG. 2 and the individual rest compartments 128c-e of FIG. 4, except that the individual passenger rest compartments 128f of the overhead passenger rest cabin 102a may be sequentially arranged along either side of the central corridor 124 extending forward (e.g., substantially parallel to the longitudinal/roll axis of the aircraft (100, FIG. 1). For example, the overhead passenger rest cabin 102a may comprise twenty (20) passenger rest compartments 128f: ten compartments on the port side of the central corridor 124 and ten opposite compartments on the starboard side. The transitional space (130, FIG. 2) between the entry vestibule (114, FIG. 2) and the overhead passenger rest cabin 102a may include handles (174) graspable by cabin crew or passengers entering the overhead passenger rest cabin via the entry vestibule. Further, graspable handles (176) may be spaced along the central corridor 124; passengers (126a, FIG. 2) traversing the central corridor (e.g., after entering the overhead passenger rest cabin 102a via the entry vestibule 114 and proceeding to their assigned passenger rest compartment 128f) may use the graspable handles to reduce strain while traversing the central corridor in a crouched position. A crew station 178 may be located at the forward end of the overhead passenger rest cabin 102 (including, e.g., emergency storage for first aid and fire containment supplies, communications facilities, and/or temporary jump seating). Similar crew stations may be located within the transitional space (130, FIG. 2) at the aft end of the overhead passenger rest cabin 102 and throughout the lower lobe passenger rest cabin (104, FIG. 4; e.g., proximate to the staircase or the point at which the entry vestibule 114 enters the lower lobe passenger rest cabin).

Figure 6:
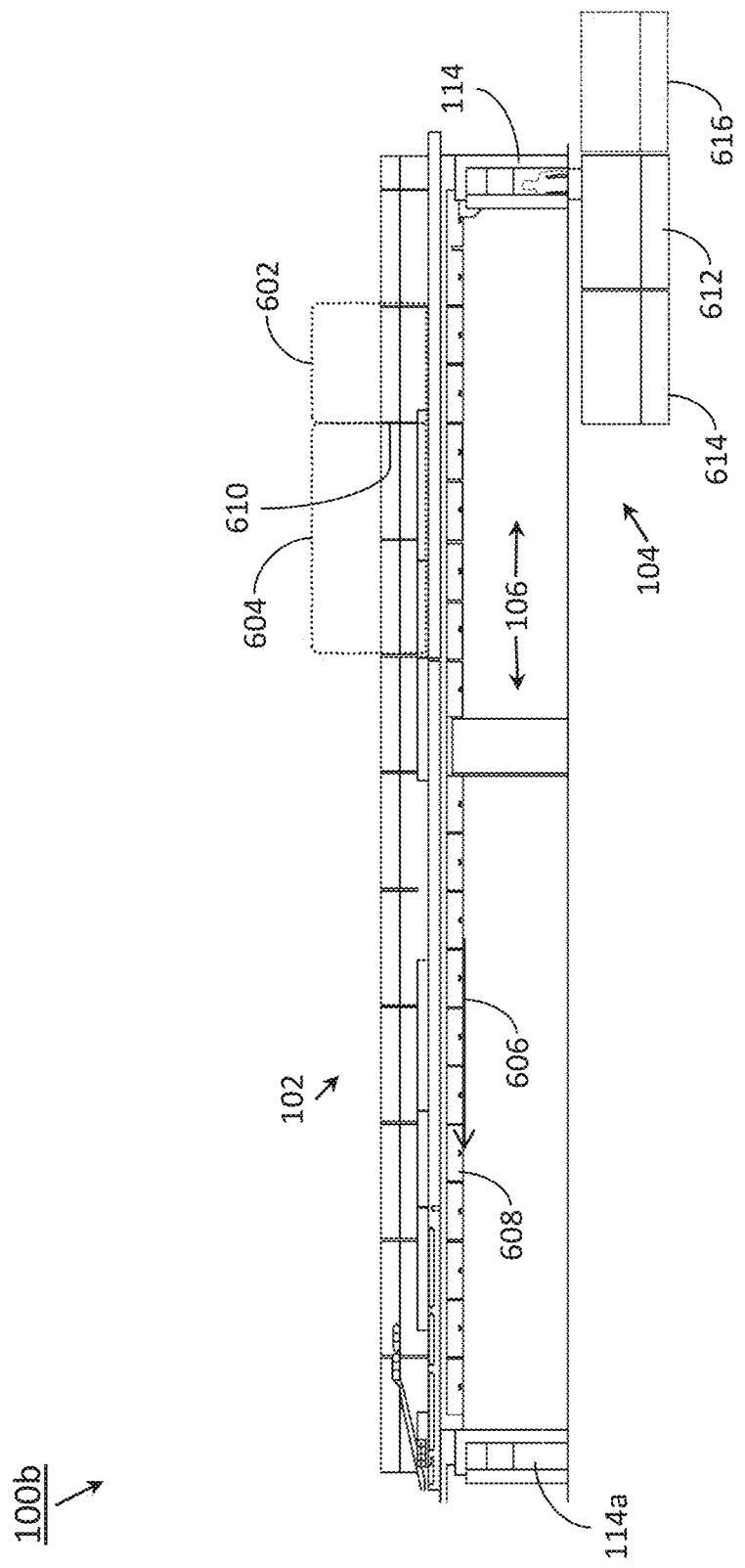
FIG. 6 is a port-side lateral cross-section of the aircraft of FIG. 1.

FIG. 6—Modular Rest Cabins

Referring to FIG. 6, the aircraft 100b may be implemented and may function similarly to the aircraft 100a of FIG. 2, except that the aircraft 100b may incorporate an overhead passenger rest cabin 102 and/or lower lobe passenger rest cabin 104 having a partially or fully modular structure.

For example, the overhead passenger rest cabin 102 may comprise a series of passenger rest compartments (128f, FIG. 5) arranged on the port and starboard sides of a central corridor (124, FIG. 5) via which the individual passenger rest compartments may be accessed. The passenger rest compartments 128f may be implemented as a series of overhead modules, e.g., a single overhead module 602 comprising one pair of passenger rest compartments (one on either side of the central corridor 124) or a double overhead module 604 comprising two pairs of passenger rest compartments (or two on either side of the central corridor). In this way the total number of passenger rest compartments 128f provided aboard the aircraft 100b may be scaled up or down as needed; similarly, overhead modules of other sizes (e.g., triple, quadruple) may be contemplated.

For example, an aftmost single or double overhead module 602, 604 may be connected to the entry vestibule 114, and successive overhead modules may proceed forward (606) of the entry vestibule. Each single or double overhead module 602, 604 may be structurally joined together by any appropriate means (e.g., with or without the use of external fasteners) and may include dedicated connection points for connecting each passenger rest compartment 128f to oxygen lines, cabin ventilation, escape hatches, electrical power, communications and network connections, and any other connections necessary for amenities and safety features provided to each passenger rest compartment. Each single or double overhead module 602, 604 may include a lower portion corresponding to the central corridor 124 extending between each pair of passenger rest compartments. In some embodiments, the aircraft 100b may be a double-aisle aircraft (as shown in an overhead plan view by FIG. 1) whereby overhead bins (608) may extend on either side of the aircraft centerline, above the centermost seats between the main aisles (116). The lower portion of each single or double overhead module 602, 604 may extend between or behind said overhead bins 608. Intersecting edges or faces (610) of adjacent overhead modules 602, 604 may incorporate sealing materials to insulate the overhead passenger rest cabin 102 from sounds or noise originating elsewhere in the aircraft 100b (e.g., from within the main passenger cabin (106, FIG. 1)).

Similarly to the overhead modules 602, 604, the lower lobe passenger rest cabins 104 may comprise one, two, or more lower lobe modules 612, 614. For example, the aftmost lower lobe module 612 may be accessible via the entry vestibule 114, with one or more additional lower lobe modules 614 coupled to the aftmost module and accessible therefrom, e.g., via a dedicated entry portal. Each lower lobe module 612, 614 may include a standardized arrangement of lower lobe passenger rest compartments (128a, 128c, 128d; FIG. 4), or a passenger rest compartment may comprise a continuous space within two adjacent lower lobe modules. Each lower lobe module 612, 614 disposed on a cargo deck below the main deck of the aircraft 100b may be sized to match the proportions of a cargo compartment and palletized or otherwise compatible with existing onboard cargo facilities (e.g., for installation to, or removal from, the aircraft 100b). Additional lower lobe modules (616) may be positioned aft, as well as forward, of the lower lobe module 610 and similarly accessible therefrom.

Figure 7:
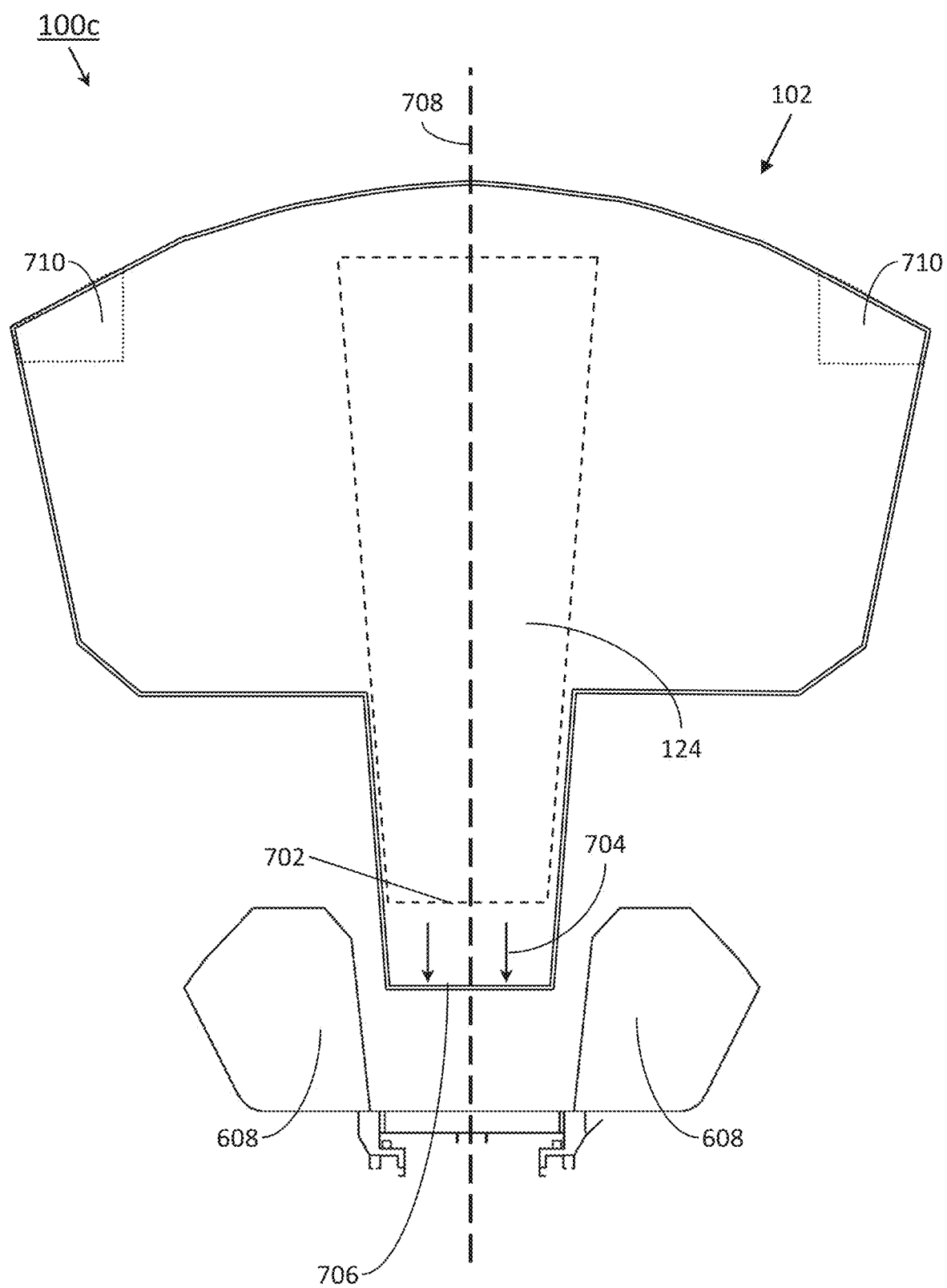
FIG. 7 is a forward cross-section of the overhead passenger rest cabin of the aircraft of FIG. 1.

FIG. 7—Lowered Ceiling

Referring to FIG. 7, the aircraft 100c may be implemented and may function similarly to the aircraft 100b of FIG. 6, except that the aircraft 100c may incorporate an overhead passenger rest cabin 102 wherein the floor (702) of the central corridor 124 may be lowered (704) to maximize vertical space within the central corridor. For example, the aircraft 100c may include a lowered ceiling (706) within the main passenger cabin (106, FIG. 1) proximate to the centerline (708) of the aircraft. The lowered ceiling 706 may be disposed between two opposing rows of overhead bins (608) and above the centermost seats within the main passenger cabin 106. Accordingly, the lowering (704) of the floor 702 of the central corridor 124 may increase the vertical height of the central corridor without detracting from the interior space available to passengers seated within the main passenger cabin 106. In embodiments where the overhead passenger rest cabin 102 comprises one or more overhead modules (602, 604; FIG. 6), the overhead passenger rest cabin 102 may provide connection points (710) for connecting each adjacent overhead module to ventilation, electrical, communications, and network connections.

FIGS. 8A/B-Notched Lavatories

Figure 8B:
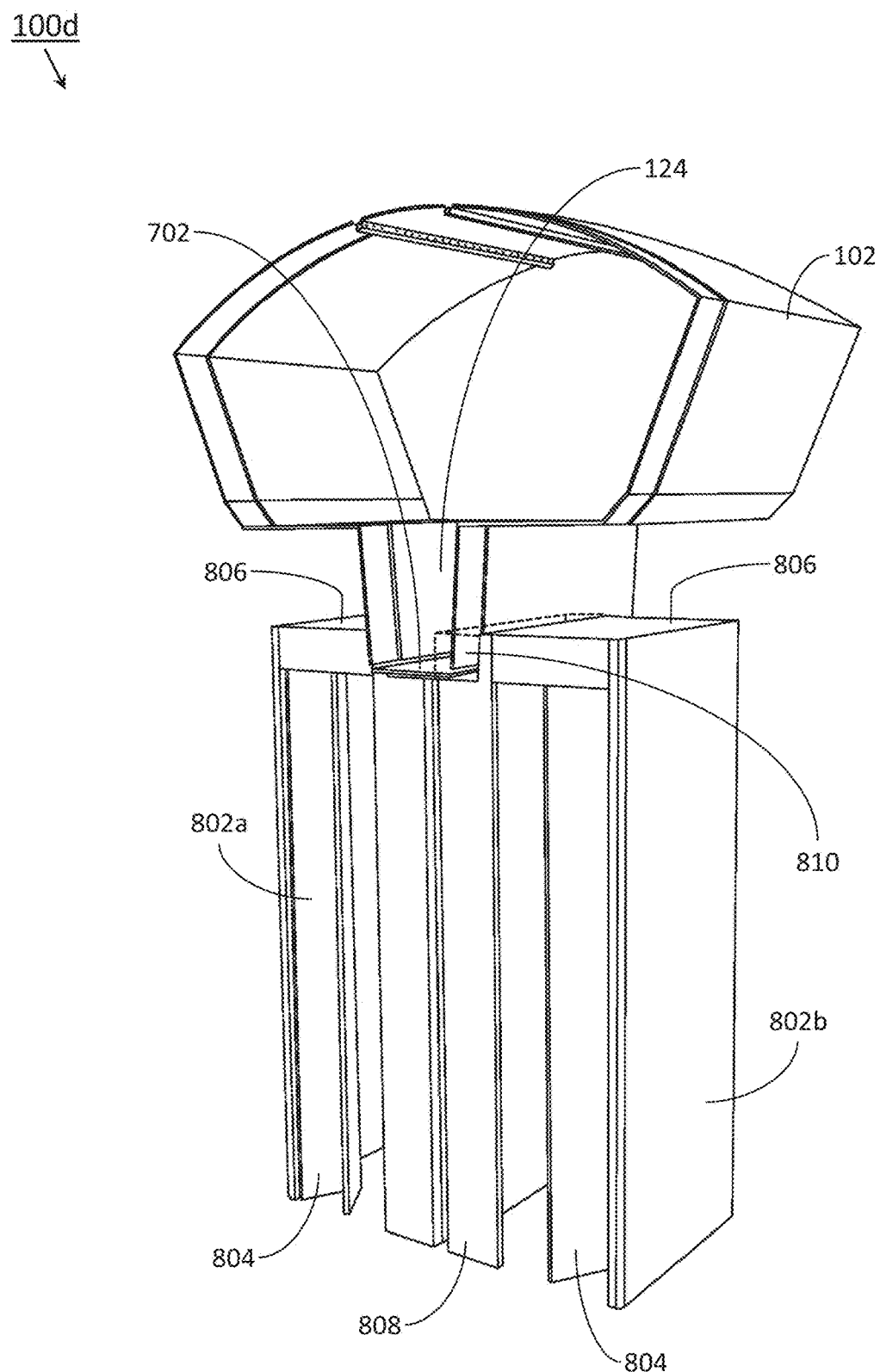

Referring to FIGS. 8A and 8B, the aircraft 100d may be implemented and may function similarly to the aircraft 100c of FIG. 7, except that the aircraft 100d may incorporate an overhead passenger rest cabin 102 so as to pass over lavatories (802) centrally located within the aircraft (e.g., between the main aisles 116, FIG. 1). The lavatories 802 may be incorporated proximate to a lateral aisle, a pair of exit doors on either side of the aircraft 100*d*, a centrally located monument, or a bulkhead/zone divider. Each lavatory 802 may be incorporated into a block of two, each individual lavatory having its own access door (804) and ceiling (806); two adjacent lavatories (802*a*, 802*b*; FIG. 8B) may share a common support structure (808). The ceilings 806 and support structure 808 may be partially notched (810; e.g., lowered, modified), to allow clearance for the floor (702) of the central corridor (124) of the overhead passenger rest cabin 102. Other monuments or structures within the main passenger cabin (106, FIG. 1) and proximate to the centerline 812 of the aircraft 100*d* may be notched or modified in similar fashion to accommodate the overhead passenger rest cabin 102.

Figure 9A:
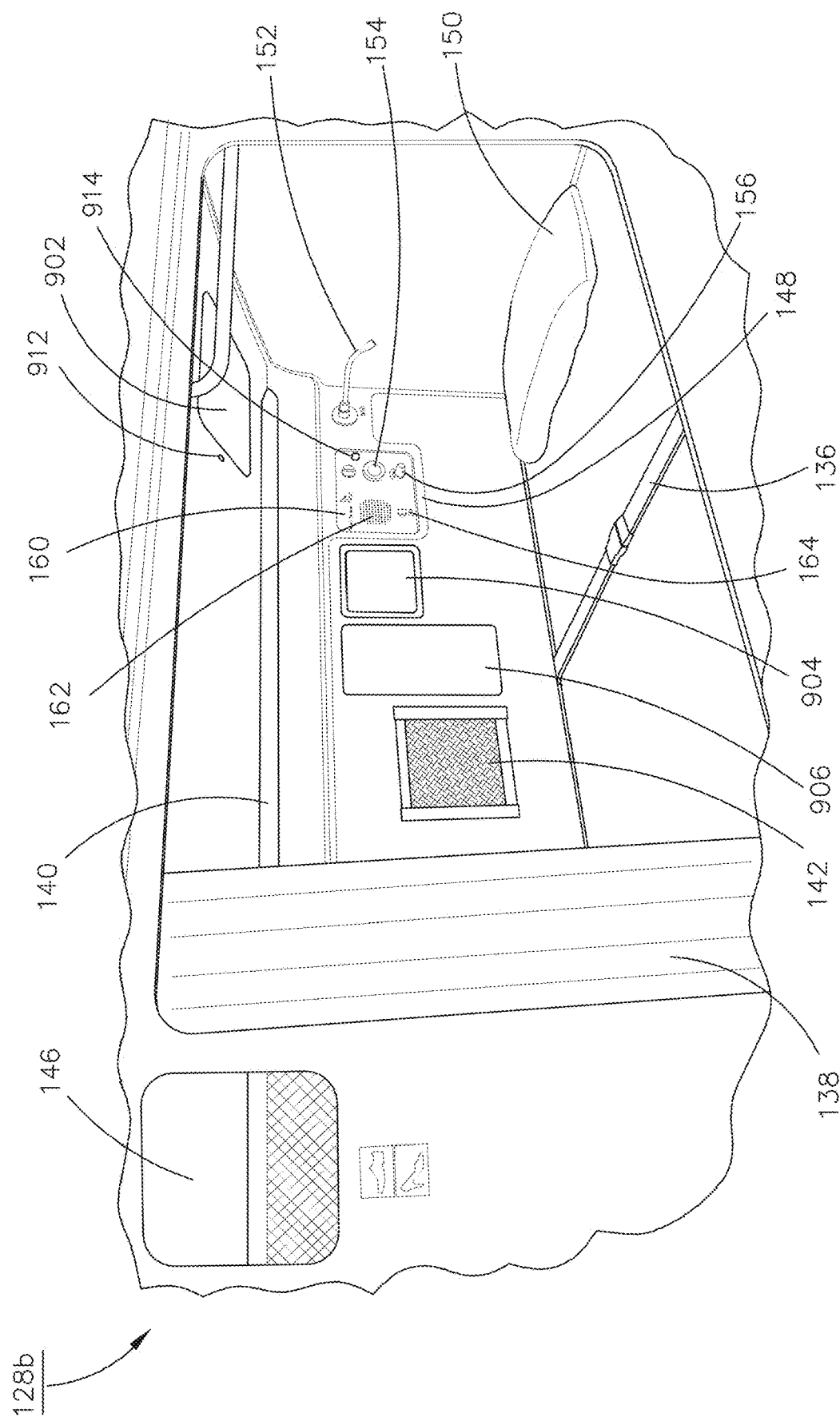
FIGS. 9A, 9B, and 9C are views of a passenger rest compartment of the aircraft of FIG. 1.
Figure 9B:
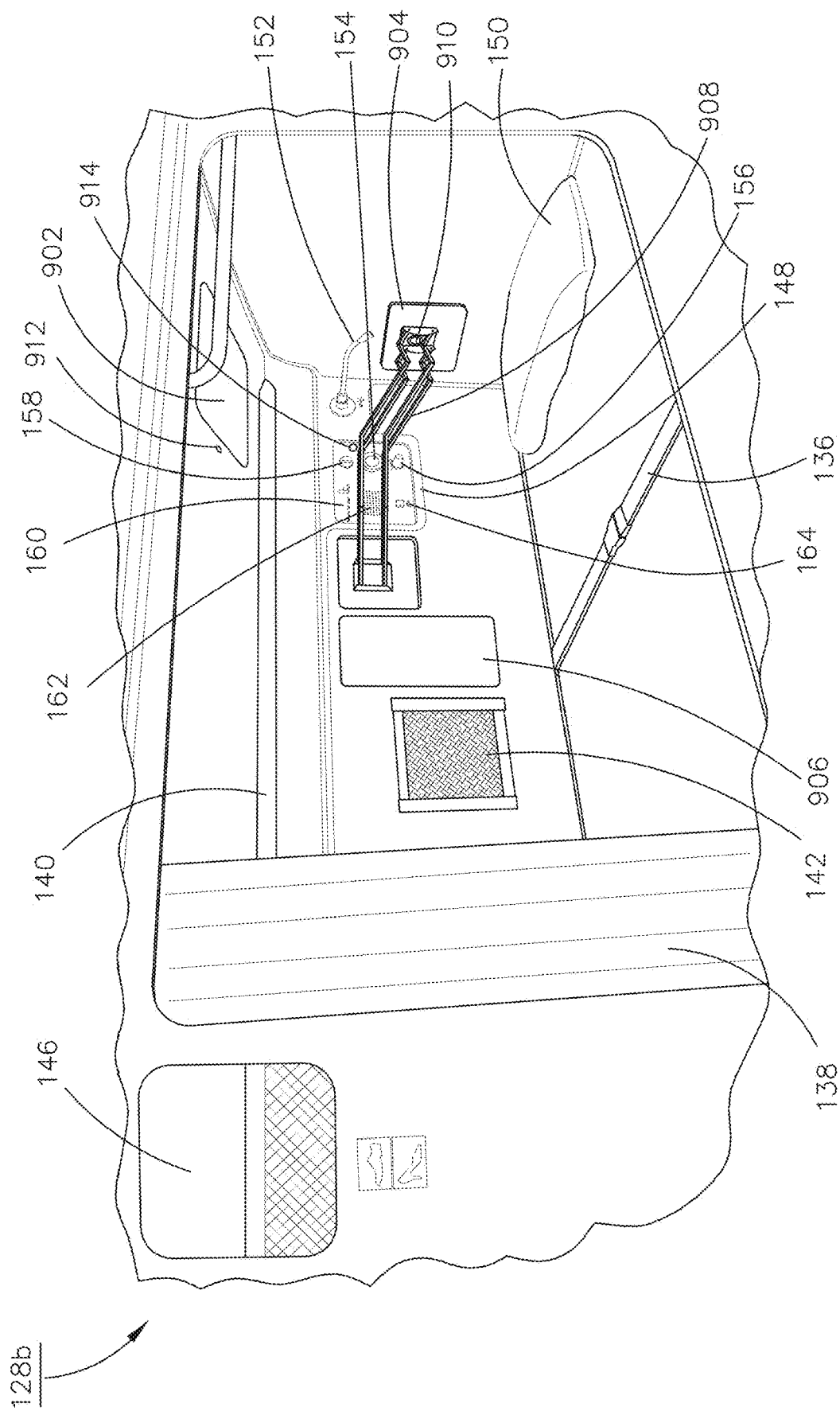
Figure 9C:
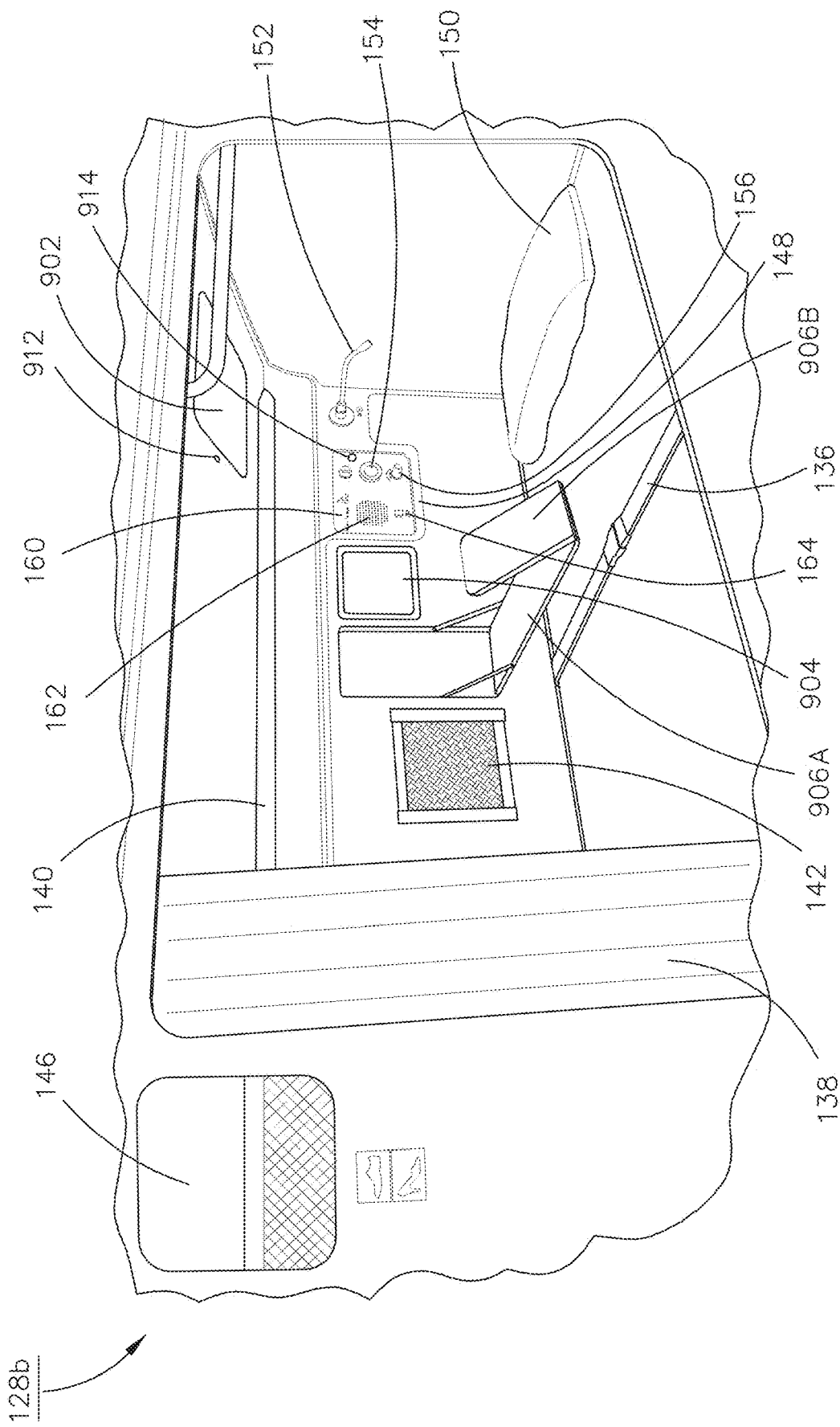

FIG. 9A-C—Individual Bunks

Referring now to FIGS. 9A-C, the passenger rest compartment 128*b* (bunk) may be implemented and may function similarly to the passenger rest compartments 128, 128*a* of FIG. 2 and to the passenger rest compartments 128*b* of FIGS. 3A-B, except that the passenger rest compartment 128*b* of FIGS. 9A-C may also include at least one display (e.g., display 902 and display 904), a stowable table 906, and at least one sensor (e.g., at least one sensor 912 and at least one sensor 914 of the PSU 148). The passenger rest compartment 128*b* may include also include one or more computing devices (e.g., 1012, PSU 148, display 902, and/or display 904).

The display 902 may be implemented in or on the ceiling of the passenger rest compartment 128*b*. The display 902 may be configured as an in-flight entertainment system display and/or a virtual window display. For example, the display 902 may be configured to display in-flight entertainment content and/or flight information content. For example, the display 902 may be configured as a virtual window display configured to display images and/or video captured by at least one external view camera (e.g., 1010), such as based on a detected position (e.g., detected by at least one sensor (e.g., 912 and/or 914)) of an occupant's head and/or based on default position (e.g., a location where the pillow 150 is shown) of an occupant's head. The display 902 may mimic an aircraft window and present at least a portion of the images captured by the at least one external view camera (e.g., 1010) outside of the aircraft. The display 902 may be implemented as any suitable display, such as a transmissive display (e.g., an LCD display) or an emissive display (e.g., a light-emitting diode (LED) display, a micro-LED display, an organic light-emitting diode (OLED) display, an active-matrix OLED (AMOLED) display, a passive-matrix OLED (PMOLED) display, or a light-emitting electrochemical cell (LEC) display). In some embodiments, the display 902 may be implemented as a touchscreen display. While FIGS. 9A-C show a single display 902, in some embodiments, the passenger rest compartment 128*b* may include multiple displays 902.

The display 904 may be implemented in or on a wall (e.g., a wall positioned orthogonally to the bed and extending lengthwise along the bed) of the passenger rest compartment 128*b*. The display 904 may be configured as an in-flight entertainment system display and/or a virtual window display. For example, the display 904 may be configured to display in-flight entertainment content and/or flight information content. For example, the display 904 may be configured as a virtual window display configured to display images and/or video captured by at least one external view camera (e.g., 1010), such as based on a detected position (e.g., detected by at least one sensor (e.g., 912 and/or 914)) of an occupant's head and/or based on default position (e.g., a location where the pillow 150 is shown) of an occupant's head. The display 904 may mimic an aircraft window and present at least a portion of the images captured by the at least one external view camera (e.g., 1010) outside of the aircraft. The display 904 may be implemented as any suitable display, such as a transmissive display (e.g., an LCD display) or an emissive display (e.g., a light-emitting diode (LED) display, a micro-LED display, an organic light-emitting diode (OLED) display, an active-matrix OLED (AMOLED) display, a passive-matrix OLED (PMOLED) display, or a light-emitting electrochemical cell (LEC) display). In some embodiments, the display 902 may be implemented as a touchscreen display. While FIGS. 9A-C show a single display 904, in some embodiments, the passenger rest compartment 128*b* may include multiple displays 904.

As shown in FIG. 9B, the display 904 may be positionable such that the display 904 is configured to be moved from a first position in or on the wall to a second position extended away from the wall. Additionally, the display 904 may be further positionable such that the display 904 is configured to be rotated to face an occupant of a given passenger rest compartment. For example, the display 904 may include extendable and positionable swing arms 908 configured to position the display 904. For example, the display 904 may include a pivot bracket 910 configured to allow the display 904 to be tilted to face an occupant.

As shown in FIG. 9C, the stowable table 906 may be implemented in or on a wall (e.g., a wall positioned orthogonally to the bed and extending lengthwise along the bed) of the passenger rest compartment 128*b*. The stowable table 906 may be configured to retract from a wall, pull out of a wall, or fold out of a wall. For example, the stowable table 906 may be positionable to be in a stowed position or a deployed position over the bed. For example, the stowable table 906 may fold out of the wall via hinges. The stowable table may include multiple fold out table portions 906A, 906B to increase the table space provided by the stowable table 906.

The passenger rest compartment 128*b* may include one or more sensors (e.g., at least one sensor 912 and/or at least one sensor 914). For example, each of the sensors may be implemented as any suitable sensor (e.g., a microphone or a camera (e.g., a visible spectrum camera and/or an infrared (IR) camera)). For example, the sensors may be configured to detect a position of an occupant's head that may be used by a processor (e.g., 1004, 1014, 1020, and/or 1030) and/or a computing device (e.g., 1002, 1012, PSU 148, display 902, and/or display 904) to determine a position of an occupant's head. The determined position of the occupant's head can be used by such processor and/or computing device to generate virtual window images that can be displayed on a virtual window display to mimic a view through an aircraft window. The virtual window images may be aligned with a field of view of the occupant based on the determined position of the occupant's head. Additionally, for example, the sensors may detect a presence of an individual in a passenger rest compartment based on one or more thermal images generated by a respective infrared camera of the passenger rest compartment 128*b*, which can be used to output an indication of the presence of the individual in the passenger rest compartment 128*b*.

One or more ventilated stowage compartments (e.g., ventilated footwear stowage compartments, such as ventilated stowage compartments 146) may be implemented in or in proximity to each of the passenger rest compartments 128b.

Figure 10:
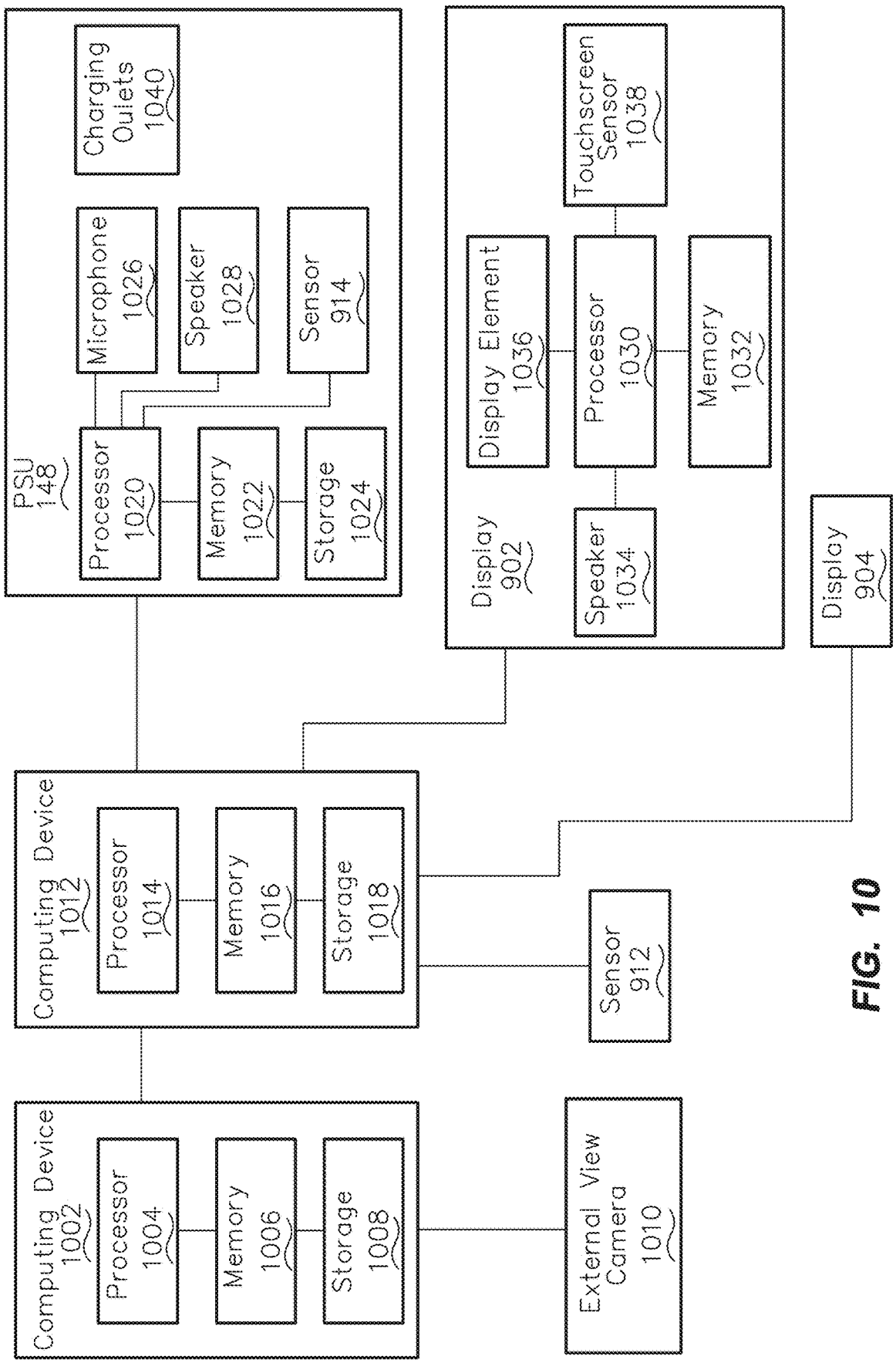
FIG. 10 is a view of an exemplary embodiment of a system of the aircraft of FIG. 1 according to the inventive concepts disclosed herein.

FIG. 10—Exemplary System

Referring now to FIG. 10, an exemplary embodiment of a system (e.g., an aircraft system) according to the inventive concepts disclosed herein may include at least one computing device 1002, at least one computing device 1012, at least one PSU 148, at least one display 902, at least one display 904, at least one sensor 912, and at least one external view camera 1010, some or all of which may be communicatively coupled at any given time. The PSU 148, the display 902, and the display 904 may be considered to be computing devices.

The external view camera 1010 may be configured to capture images outside of the aircraft. For example, an external view camera 1010 may be installed on each side of the aircraft such that the external view cameras 1010 capture external views of two sides of the aircraft. For example, the external view cameras 1010 may be installed in or on passenger windows of the passenger cabin of the aircraft such that the external view cameras 1010 capture images that passengers seated next to the windows would view. The external view cameras 1010 may be configured to output captured image data and/or video data to at least one computing device (e.g., computing device 1002 and/or 1012).

The computing device 1002 may include at least one processor 1004, at least one memory 1006, and at least one storage device 1008, as well as other components, equipment, and/or devices commonly included in a computing device, some or all of which may be communicatively coupled. The processor 1004 may be implemented as any suitable processor, such as a general purpose processor, an FPGA, and/or an image processor. For example, the computing device 1002 may be configured to receive image data and/or video data from the external view camera 1010 and to output or route the image data and/or video data to another computing device (e.g., computing device 1012, display 902, and/or display 904). For example, the computing device 1002 may be configured to receive an indication of the presence of an individual in the passenger rest compartment 128b from another computing device (e.g., computing device 1012 and/or PSU 148) and to present, via a user input/output device (e.g., a display or a speaker), the indication of the presence of the individual in the passenger rest compartment 128b to a crew member. The processor 1004 may be configured to run various software applications or computer code stored (e.g., maintained) in a non-transitory computer-readable medium and configured to execute various instructions or operations. Additionally, for example, the computing device 1002 or the processor 1004 may be implemented as special purpose computers or special purpose processors configured (e.g., programmed) to execute instructions for performing any or all of the operations disclosed throughout. In some embodiments, the system of FIG. 1 may include any suitable number of computing devices 1002, such as a plurality.

While the computing device 1002 exemplarily includes elements as shown, in some embodiments, one or more of the elements of the computing device 1002 may be omitted, or the computing device 1002 may include other elements.

The computing device 1012 may include at least one processor 1014, at least one memory 1016, and at least one storage device 1018, as well as other components, equipment, and/or devices commonly included in a computing device, some or all of which may be communicatively coupled. The processor 1014 may be implemented as any suitable processor, such as a general purpose processor, an FPGA, and/or an image processor. For example, the computing device 1012 may be configured to receive image data and/or video data from the external view camera 1010 and/or the computing device 1002 and to receive sensor data from a sensor (e.g., sensor 912 and/or sensor 914). For example, the computing device 1012 may be configured to generate virtual window image data from the received image data and/or video data by utilizing a detected position (e.g., detected by a sensor (e.g., sensor 912 and/or sensor 914)) or a predetermined default position of an occupant's head such that the virtual window image data is aligned with the occupant's field of view to mimic a view through an aircraft window, and the computing device 1012 may output the generated virtual window image data to a display (e.g., 902 and/or 904) to be presented to the occupant as virtual window content. Additionally, for example, the computing device 1012 may be configured to determine or detect a presence of an individual in the passenger rest compartment 128b based on one or more thermal images generated by a sensor (e.g., sensor 912 and/or sensor 914, such as an infrared camera) of the passenger rest compartment 128b and to output an indication of the presence of the individual in the passenger rest compartment to another computing device (e.g., computing device 1002). Additionally, for example, the computing device 1012 may be configured to receive flight information data and output the flight information data to a display (e.g., 902 and/or 904) for presentation as flight information content to an occupant. Additionally, for example, the computing device 1012 may be configured to receive in-flight entertainment data and output the in-flight entertainment data to a display (e.g., 902 and/or 904) for presentation as in-flight entertainment content to an occupant. The processor 1014 may be configured to run various software applications or computer code stored (e.g., maintained) in a non-transitory computer-readable medium and configured to execute various instructions or operations. Additionally, for example, the computing device 1012 or the processor 1014 may be implemented as special purpose computers or special purpose processors configured (e.g., programmed) to execute instructions for performing any or all of the operations disclosed throughout. In some embodiments, the system of FIG. 1 may include any suitable number of computing devices 1012, such as a plurality.

While the computing device 1012 exemplarily includes elements as shown, in some embodiments, one or more of the elements of the computing device 1012 may be omitted, or the computing device 1012 may include other elements.

The sensors (e.g., 912 and/or 914) may be implemented as any suitable sensor (e.g., a microphone or a camera (e.g., a visible spectrum camera and/or an infrared (IR) camera)). For example, the sensors may be configured to detect a position of an occupant's head that may be used by a processor (e.g., 1004, 1014, 1020, and/or 1030) and/or a computing device (e.g., 1002, 1012, PSU 148, display 902, and/or display 904) to determine a position of an occupant's head that can be used by such processor and/or computing device to generate a virtual window images that can be displayed on a virtual window display to mimic a view through an aircraft window. Additionally, for example, the sensors may detect a presence of an individual in a passenger rest compartment based on one or more thermal images generated by a respective infrared camera of the passenger rest compartment 128b, which can be used to output an indication of the presence of the individual in the passenger rest compartment 128b.

The display 902 may include at least one processor 1030, at least one memory 1032, at least one speaker 1034, at least one display element 1036, and at least one touchscreen sensor 1038, as well as other components, equipment, and/or devices commonly included in a display, some or all of which may be communicatively coupled. The display 902 may be configured to display content received from a computing device (e.g., computing device 1002 and/or 1012). The processor 1030 may be configured to run various software applications or computer code stored (e.g., maintained) in a non-transitory computer-readable medium and configured to execute various instructions or operations. Additionally, for example, the display 902 or the processor 1030 may be implemented as special purpose computers or special purpose processors configured (e.g., programmed) to execute instructions for performing any or all of the operations disclosed throughout. In some embodiments, the system of FIG. 1 may include any suitable number of displays 902, such as a plurality. While the display 902 exemplarily includes elements as shown, in some embodiments, one or more of the elements of the display 902 may be omitted, or the display 902 may include other elements.

The display 904 may be implemented similarly and function similarly to the display 902, except that the display 904 may be implemented in or on a ceiling of the passenger rest compartment 128b. In some embodiments, the system of FIG. 1 may include any suitable number of displays 904, such as a plurality.

The PSU 148 may include at least one processor 1020, at least one memory 1022, at least one storage device 1024, at least one microphone 1026, at least one speaker 1028, at least one sensor 914, at least one charging outlet 1040 (e.g., a two-prong standard power socket, a three-prong standard power socket, and/or a powered universal serial bus (USB) outlet), a display element, temperature controls 156, and one or more buttons (e.g., a crew call button 158), as well as other components, equipment, and/or devices commonly included in a PSU, some or all of which may be communicatively coupled. The PSU 148 may be configured to allow two-way audio communication between an occupant of a given passenger rest compartment 128b and crew in another part of the aircraft, such as by exchanging audio data with another computing device (e.g., 1002 and/or 1012). The processor 1020 may be configured to run various software applications or computer code stored (e.g., maintained) in a non-transitory computer-readable medium and configured to execute various instructions or operations. Additionally, for example, the PSU 148 or the processor 1020 may be implemented as special purpose computers or special purpose processors configured (e.g., programmed) to execute instructions for performing any or all of the operations disclosed throughout. In some embodiments, the system of FIG. 1 may include any suitable number of PSUs 148, such as a plurality. While the PSU 148 exemplarily includes elements as shown, in some embodiments, one or more of the elements of the PSU 148 may be omitted, or the PSU 148 may include other elements.

While the computing device 1002, the computing device 1012, the PSU 148, the display 902, the display 904, the sensor 912, and the external view camera 1010 have been exemplarily depicted as being implemented as separate devices or subsystems, in some embodiments, some or all of the computing device 1002, the computing device 1012, the PSU 148, the display 902, the display 904, the sensor 912, and the external view camera 1010 may be implemented as a single integrated system or device or as any number of integrated and/or partially integrated subsystems and/or devices.

As will be appreciated from the above, embodiments of the inventive concepts disclosed herein may be directed to a system including a vestibule disposed in a passenger cabin of an aircraft, at least one passenger rest cabin implemented above or below a passenger cabin of the aircraft, and a plurality of passenger rest compartments implemented in the at least one passenger rest cabin.

As used throughout and as would be appreciated by those skilled in the art, "at least one non-transitory computer-readable medium" may refer to as at least one non-transitory computer-readable medium (e.g., at least one computer-readable medium implemented as hardware; e.g., at least one non-transitory processor-readable medium, at least one memory (e.g., at least one nonvolatile memory, at least one volatile memory, or a combination thereof; e.g., at least one random-access memory, at least one flash memory, at least one read-only memory (ROM) (e.g., at least one electrically erasable programmable read-only memory (EEPROM)), at least one on-processor memory (e.g., at least one on-processor cache, at least one on-processor buffer, at least one on-processor flash memory, at least one on-processor EEPROM, or a combination thereof), or a combination thereof), at least one storage device (e.g., at least one hard-disk drive, at least one tape drive, at least one solid-state drive, at least one flash drive, at least one readable and/or writable disk of at least one optical drive configured to read from and/or write to the at least one readable and/or writable disk, or a combination thereof), or a combination thereof).

As used throughout, "at least one" means one or a plurality of; for example, "at least one" may comprise one, two, three, . . . , one hundred, or more. Similarly, as used throughout, "one or more" means one or a plurality of; for example, "one or more" may comprise one, two, three, . . . , one hundred, or more. Further, as used throughout, "zero or more" means zero, one, or a plurality of; for example, "zero or more" may comprise zero, one, two, three, . . . , one hundred, or more.

In the present disclosure, the methods, operations, and/or functionality disclosed may be implemented as sets of instructions or software readable by a device. Further, it is understood that the specific order or hierarchy of steps in the methods, operations, and/or functionality disclosed are examples of exemplary approaches. Based upon design preferences, it is understood that the specific order or hierarchy of steps in the methods, operations, and/or functionality can be rearranged while remaining within the scope of the inventive concepts disclosed herein. The accompanying claims may present elements of the various steps in a sample order, and are not necessarily meant to be limited to the specific order or hierarchy presented.

It is to be understood that embodiments of the methods according to the inventive concepts disclosed herein may include one or more of the steps described herein. Further, such steps may be carried out in any desired order and two or more of the steps may be carried out simultaneously with one another. Two or more of the steps disclosed herein may be combined in a single step, and in some embodiments, one or more of the steps may be carried out as two or more sub-steps. Further, other steps or sub-steps may be carried in addition to, or as substitutes to one or more of the steps disclosed herein.

From the above description, it is clear that the inventive concepts disclosed herein are well adapted to carry out the objects and to attain the advantages mentioned herein as well as those inherent in the inventive concepts disclosed herein. While presently preferred embodiments of the inventive concepts disclosed herein have been described for purposes of this disclosure, it will be understood that numerous changes may be made which will readily suggest themselves to those skilled in the art and which are accomplished within the broad scope and coverage of the inventive concepts disclosed and claimed herein.

What is claimed is:

1. A system, comprising:
a vestibule disposed in a passenger cabin of an aircraft, the vestibule including at least one staircase for accessing at least one passenger rest cabin, each of the at least one passenger rest cabin implemented above or below the passenger cabin of the aircraft;
at least one external view camera configured to capture images outside of the aircraft; and
a plurality of passenger rest compartments implemented in the at least one passenger rest cabin, each of the plurality of the passenger rest compartments including a bed and a passenger service unit (PSU),
wherein each of the plurality of the passenger rest compartments further includes a display, wherein for each of the plurality of the passenger rest compartments the display is configured to be a virtual window configured to mimic an aircraft window and to present at least a portion of the images outside of the aircraft.

2. The system of claim 1, wherein the at least one staircase comprises a staircase, wherein the at least one passenger rest cabin comprises a passenger rest cabin, wherein the vestibule includes the staircase for accessing the passenger rest cabin above the passenger cabin of the aircraft.

3. The system of claim 2, wherein the passenger rest cabin includes a central corridor, wherein some of the plurality of passenger rest compartments are implemented on a first side of the central corridor and other of the plurality of passenger rest compartments are implemented on a second side of the central corridor.

4. The system of claim 1, wherein the at least one staircase comprises a staircase, wherein the at least one passenger rest cabin comprises a passenger rest cabin, wherein the vestibule includes the staircase for accessing the passenger rest cabin below the passenger cabin of the aircraft.

5. The system of claim 1, wherein each of the plurality of the passenger rest compartments further includes a wall, wherein for each of the plurality of the passenger rest compartments the PSU is implemented in or on the wall.

6. The system of claim 1, wherein for each of the plurality of the passenger rest compartments the PSU includes a microphone, a speaker, temperature controls, at least one charging outlet, and a crew call button and is configured to allow two-way audio communication between an occupant of a given passenger rest compartment and crew in another part of the aircraft.

7. The system of claim 1, wherein for each of the plurality of the passenger rest compartments the PSU includes a microphone and a speaker and is configured to allow two-way audio communication between an occupant of a given passenger rest compartment and crew in another part of the aircraft.

8. The system of claim 1, wherein for each of the plurality of the passenger rest compartments the display is configured to present in-flight entertainment to an occupant of a given passenger rest compartment.

9. The system of claim 1, wherein each of the plurality of the passenger rest compartments further includes a wall, wherein for each of the plurality of the passenger rest compartments the display is implemented in or on the wall.

10. The system of claim 9, wherein for each of the plurality of the passenger rest compartments the display is positionable such that the display is configured to be moved from a first position in or on the wall to a second position extended away from the wall.

11. The system of claim 10, wherein for each of the plurality of the passenger rest compartments the display is further positionable such that the display is configured to tilt to face an occupant of a given passenger rest compartment.

12. The system of claim 1, wherein each of the plurality of the passenger rest compartments further includes at least one sensor configured to detect a position of an occupant's head, wherein for each of the plurality of the passenger rest compartments the display is configured to be the virtual window configured to mimic the aircraft window and to present at least the portion of the images outside of the aircraft based on a detected or predetermined default position of the occupant's head.

13. The system of claim 1, wherein each of the plurality of the passenger rest compartments further includes a ceiling positioned above the bed, wherein for each of the plurality of the passenger rest compartments the display is implemented in or on the ceiling.

14. The system of claim 1, further comprising at least one ventilated stowage compartment configured to stow footwear, each of the at least one ventilated stowage compartment implemented in or in proximity to one of the plurality of the passenger rest compartments.

15. The system of claim 1, wherein each of the plurality of the passenger rest compartments further includes a stowable table positionable to be in a stowed position or a deployed position over the bed.

16. A system, comprising:
a vestibule disposed in a passenger cabin of an aircraft, the vestibule including a first staircase and a second staircase, the first staircase for accessing a first passenger rest cabin, the second staircase for accessing a second passenger rest cabin, the first passenger rest cabin implemented above the passenger cabin of the aircraft, the second passenger rest cabin implemented below the passenger cabin of the aircraft;
at least one external view camera configured to capture images outside of the aircraft; and
a plurality of passenger rest compartments implemented in the first passenger rest cabin and the second passenger rest cabin, each of the plurality of the passenger rest compartments including a bed and a passenger service unit (PSU),
wherein each of the plurality of the passenger rest compartments further includes a display, wherein for each of the plurality of the passenger rest compartments the display is configured to be a virtual window configured to mimic an aircraft window and to present at least a portion of the images outside of the aircraft.

17. An aircraft system, comprising:
a vestibule disposed in a passenger cabin of an aircraft, the vestibule including a staircase for accessing a passenger rest cabin implemented above the passenger cabin of the aircraft;
at least one external view camera configured to capture images outside of the aircraft; and
a plurality of passenger rest compartments implemented in the passenger rest cabin, each of the plurality of the passenger rest compartments including a bed, a display, and a passenger service unit (PSU), wherein each of the plurality of the passenger rest compartments further includes a display, wherein for each of the plurality of the passenger rest compartments the display is configured to be a virtual window configured to mimic an aircraft window and to present at least a portion of the images outside of the aircraft, wherein the passenger rest cabin includes a central corridor and graspable handles spaced along the central corridor, wherein some of the plurality of passenger rest compartments are implemented on a first side of the central corridor and other of the plurality of passenger rest compartments are implemented on a second side of the central corridor.

\* \* \* \* \*